US010904877B2

(12) United States Patent
Bontu et al.

(10) Patent No.: US 10,904,877 B2
(45) Date of Patent: Jan. 26, 2021

(54) TD LTE SECONDARY COMPONENT CARRIER IN UNLICENSED BANDS

(71) Applicant: BlackBerry Limited, Waterloo (CA)

(72) Inventors: Chandra Sekhar Bontu, Nepean (CA); Shalini Suresh Periyalwar, Toronto (CA)

(73) Assignee: BlackBerry Limited, Waterloo (CA)

( * ) Notice: Subject to any disclaimer, the term of this patent is extended or adjusted under 35 U.S.C. 154(b) by 128 days.

(21) Appl. No.: 15/990,118

(22) Filed: May 25, 2018

(65) Prior Publication Data

US 2018/0376475 A1 Dec. 27, 2018

Related U.S. Application Data

(63) Continuation of application No. 14/925,378, filed on Oct. 28, 2015, now Pat. No. 9,986,559, which is a continuation of application No. 13/572,092, filed on Aug. 10, 2012, now Pat. No. 9,184,886.

(51) Int. Cl.
| | | |
|---|---|---|
| *H04W 4/00* | (2018.01) | |
| *H04W 72/04* | (2009.01) | |
| *H04W 16/14* | (2009.01) | |
| *H04L 5/00* | (2006.01) | |
| *H04L 27/00* | (2006.01) | |
| *H04W 24/10* | (2009.01) | |
| *H04W 48/02* | (2009.01) | |

(52) U.S. Cl.
CPC ......... *H04W 72/0446* (2013.01); *H04L 5/001* (2013.01); *H04L 27/0006* (2013.01); *H04W 16/14* (2013.01); *H04W 24/10* (2013.01); *H04L 5/0098* (2013.01); *H04W 48/02* (2013.01)

(58) Field of Classification Search
CPC ...................................................... H04L 5/001
See application file for complete search history.

(56) References Cited

U.S. PATENT DOCUMENTS

| | | | |
|---|---|---|---|
| 8,494,546 B2 | 7/2013 | Hu | |
| 8,606,184 B1 | 12/2013 | Luthra | |
| 8,831,014 B2 * | 9/2014 | Koodli | .................... H04L 12/14 370/401 |

(Continued)

FOREIGN PATENT DOCUMENTS

| | | | |
|---|---|---|---|
| CN | 101835191 A | 9/2010 | |
| GB | 2477649 A | 8/2011 | |

(Continued)

OTHER PUBLICATIONS

The Wireless Innovation Forum; "TD-LTE White Space Task Group Face to Face Meeting"; http://sdf.memberclicks.net/index.php?option=com_mc&view=mc&mcid=72&,eventld=303650; Feb. 24-25, 2011; Yokosuka, Japan; 1 page.

(Continued)

*Primary Examiner* — Guang W Li
(74) *Attorney, Agent, or Firm* — Conley Rose, P. C.; J. Robert Brown, Jr.; Gayatry S. Nair

(57) ABSTRACT

A method is provided for communication in a wireless telecommunication system. The method comprises adaptively designating, by a network element following a frame-based communication protocol, for use as a secondary component carrier in a carrier aggregation scheme, at least a portion of radio resources on an unlicensed band.

17 Claims, 23 Drawing Sheets

(56) References Cited

U.S. PATENT DOCUMENTS

| | | | |
|---|---|---|---|
| 9,184,886 B2 | 11/2015 | Bontu et al. | |
| 9,503,240 B2* | 11/2016 | Kim | H04L 5/0092 |
| 9,986,559 B2 | 5/2018 | Bontu et al. | |
| 2008/0108366 A1 | 5/2008 | Hu | |
| 2008/0220787 A1 | 9/2008 | Stanwood et al. | |
| 2010/0020732 A1 | 1/2010 | Gaddam et al. | |
| 2010/0142463 A1 | 6/2010 | Hu | |
| 2010/0222060 A1* | 9/2010 | Zhang | H04W 36/30 455/436 |
| 2010/0226343 A1 | 9/2010 | Hsu et al. | |
| 2011/0092219 A1* | 4/2011 | Damnjanovic | H04W 52/281 455/450 |
| 2011/0105107 A1* | 5/2011 | Kwon | H04L 5/0098 455/422.1 |
| 2011/0201370 A1* | 8/2011 | Lim | H04L 5/001 455/509 |
| 2011/0274043 A1* | 11/2011 | Nam | H04L 5/001 370/328 |
| 2011/0292812 A1* | 12/2011 | Kim | H04L 5/0044 370/242 |
| 2012/0039252 A1* | 2/2012 | Damnjanovic | H04L 1/0026 370/328 |
| 2012/0063373 A1 | 3/2012 | Chincholi et al. | |
| 2012/0076041 A1* | 3/2012 | Jung | H04W 24/10 370/252 |
| 2012/0076119 A1* | 3/2012 | Li | H04L 5/001 370/338 |
| 2012/0094681 A1 | 4/2012 | Freda et al. | |
| 2012/0129522 A1 | 5/2012 | Kim et al. | |
| 2012/0140649 A1* | 6/2012 | Choudhury | H04W 24/10 370/252 |
| 2012/0140708 A1* | 6/2012 | Choudhury | H04L 1/0031 370/328 |
| 2012/0250631 A1* | 10/2012 | Hakola | H04L 5/0094 370/329 |
| 2013/0022007 A1* | 1/2013 | Berggren | H04L 5/0053 370/329 |
| 2013/0039193 A1 | 2/2013 | Yin et al. | |
| 2013/0142043 A1 | 6/2013 | Tapia et al. | |
| 2013/0165134 A1* | 6/2013 | Touag | H04W 72/0486 455/452.1 |
| 2013/0188569 A1 | 7/2013 | He et al. | |
| 2013/0194951 A1* | 8/2013 | Kim | H04L 5/0053 370/252 |
| 2013/0242817 A1 | 9/2013 | He et al. | |
| 2013/0258895 A1* | 10/2013 | Kim | H04L 5/0055 370/252 |
| 2013/0322279 A1 | 12/2013 | Chincholi et al. | |
| 2013/0337821 A1 | 12/2013 | Clegg | |
| 2014/0029561 A1 | 1/2014 | Kim et al. | |
| 2014/0031054 A1 | 1/2014 | Zou et al. | |
| 2014/0044105 A1* | 2/2014 | Bontu | H04W 16/14 370/336 |
| 2014/0071933 A1 | 3/2014 | Lee et al. | |
| 2014/0241265 A1* | 8/2014 | Pragada | H04W 72/04 370/329 |
| 2014/0362745 A1 | 12/2014 | Davydov et al. | |
| 2015/0045029 A1* | 2/2015 | Dalsgaard | H04W 24/10 455/436 |
| 2015/0103663 A1* | 4/2015 | Amini | H04B 1/0053 370/235 |
| 2015/0126207 A1 | 5/2015 | Li et al. | |
| 2015/0131536 A1 | 5/2015 | Kaur et al. | |
| 2015/0223115 A1 | 8/2015 | Liang et al. | |

FOREIGN PATENT DOCUMENTS

| | | |
|---|---|---|
| WO | 2006022603 A2 | 3/2006 |
| WO | 2006092465 A1 | 9/2006 |
| WO | 2010018505 A2 | 2/2010 |
| WO | 2012039656 A1 | 3/2012 |
| WO | 2012078565 A1 | 6/2012 |

OTHER PUBLICATIONS

Pedersen, Klaus, et al.; "Carrier Aggregation for LTE-Advanced: Functionality and Performance Aspects"; IEEE Communications Magazine; Jun. 2011; 11 pages.

Berlemann, Lars, et al.; "Unlicensed Operation of IEEE 802.16: Coexistence with 802.11(A) in Shared Frequency Bands"; 17th Annual IEEE International Symposium; 2006; 5 pages.

3GPP TS 25.105 V10.3.0; 3rd Generation Partnership Project; Technical Specification Group Radio Access Network; Base Station (BS) Radio Transmission and Reception (TDD); Release 10; Jun. 2011; 118 pages.

3GPP TR 36.808 V1.7.0; 3rd Generation Partnership Project; Technical Specification Group Radio Access Network; Evolved Universal Terrestrial Radio Access (E-UTRA); Carrier Aggregation; Base Station (BS) Radio Transmission and Reception; Release 10; Aug. 2011; 27 pages.

3GPP TS 36.211 V10.5.0; 3rd Generation Partnership Project; Technical Specification Group Radio Access Network; Evolved Universal Terrestrial Radio Access (E-UTRA); Physical Channels and Modulation; Release 10; Jun. 2012; 101 pages.

3GPP TS 36.211 V10.3.0; 3rd Generation Partnership Project; Technical Specification Group Radio Access Network; Evolved Universal Terrestrial Radio Access (E-UTRA); Physical Channels and Modulation; Release 10; Sep. 2011; 103 pages.

Walke, Bernhard H., et al.; "IEEE 802 Wireless Systems"; 2006; 30 pages.

Office Action dated Dec. 22, 2014; U.S. Appl. No. 13/572,092, filed Aug. 10, 2012; 28 pages.

Notice of Allowance dated Jul. 8, 2015; U.S. Appl. No. 13/572,092, filed Aug. 10, 2012; 29 pages.

Office Action dated Apr. 12, 2017; U.S. Appl. No. 14/925,378, filed Oct. 28, 2015; 27 pages.

Final Office Action dated Oct. 19, 2017; U.S. Appl. No. 14/925,378, filed Oct. 28, 2015; 18 pages.

Advisory Action dated Jan. 2, 2018; U.S. Appl. No. 14/925,378, filed Oct. 28, 2015; 3 pages.

Notice of Allowance dated Jan. 24, 2018; U.S. Appl. No. 14/925,378, filed Oct. 28, 2015; 9 pages.

Canadian Office Action; Application No. 2,823,450; dated Feb. 20, 2015; 4 pages.

Canadian Office Action; Application No. 2,823,450; dated Dec. 8, 2015; 4 pages.

Canadian Office Action; Application No. 2,823,450; dated Oct. 14, 2016; 6 pages.

Chinese Office Action; Application No. 201310344012.1; dated Feb. 3, 2016; 26 pages.

Chinese Office Action; Application No. 201310344012.1; dated Oct. 17, 2016; 17 pages.

European Partial Search Report; Application No. 13179969.4; dated Mar. 6, 2014; 7 pages.

European Extended Search Report; Application No. 13179969.4; dated Jun. 27, 2014; 18 pages.

European Examination Report; Application No. 13179969.4; dated Jul. 3, 2017; 7 pages.

European Extended Search Report; Application No. 19159089.2; dated Jul. 8, 2019; 8 pages.

\* cited by examiner

TD LTE SECONDARY COMPONENT CARRIER IN UNLICENSED BANDS

CROSS-REFERENCE TO RELATED APPLICATIONS

This application is a continuation of U.S. patent application Ser. No. 14/925,378 filed on Oct. 28, 2015 entitled, "TD LTE Secondary Component Carrier in Unlicensed Bands"), which claims priority to U.S. Pat. No. 9,184,886 issued on Nov. 10, 2015 entitled, "TD LTE Secondary Component Carrier in Unlicensed Bands" Ser. No. 13/572,092, both of which are incorporated by reference herein as if reproduced in their entirety.

FIELD OF THE DISCLOSURE

The present disclosure relates to component carriers in wireless telecommunications systems.

BACKGROUND

As used herein, the term "user equipment" (alternatively "UE") might in some cases refer to mobile devices such as mobile telephones, personal digital assistants, handheld or laptop computers, and similar devices that have telecommunications capabilities. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device," "mobile device", and "device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. Any such component will be referred to herein as an eNB, but it should be understood that such a component is not necessarily an eNB. Such a component may also be referred to herein as an access node.

An eNB or similar component that has a small coverage area such as a home may be referred to as a home eNB (HeNB) or a femtocell. The discussion hereinafter may focus on HeNBs, but it should be understood that the embodiments disclosed herein are not necessarily restricted to HeNBs. An access point compliant with the IEEE 802.11 standards may be referred to as a WiFi access point (AP). LTE, WiFi, and other technologies that may be used in wireless communications may be referred to as radio access technologies (RATs).

LTE may be said to correspond to Third Generation Partnership Project (3GPP) Release 8 (Rel-8 or R8) and Release 9 (Rel-9 or R9), and possibly also to releases beyond Release 9, while LTE Advanced (LTE-A) may be said to correspond to Release 10 (Rel-10 or R10) and possibly also to Release 11 (Rel-11 or R11) and other releases beyond Release 10. As used herein, the terms "legacy", "legacy UE", and the like might refer to signals, UEs, and/or other entities that comply with LTE Release 10 and/or earlier releases but do not fully comply with releases later than Release 10. The terms "advanced", "advanced UE", and the like might refer to signals, UEs, and/or other entities that comply with LTE Release 11 and/or later releases. While the discussion herein deals with LTE systems, the concepts are equally applicable to other wireless systems as well.

In an LTE system, uplink (UL) and downlink (DL) transmissions are organized into one of two duplex modes, frequency division duplex (FDD) mode and time division duplex (TDD) mode. The FDD mode uses paired spectrum where the frequency domain is used to separate the UL and DL transmissions. In TDD systems, on the other hand, unpaired spectrum is used where both UL and DL are transmitted over the same carrier frequency. The UL and DL are separated in the time domain.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
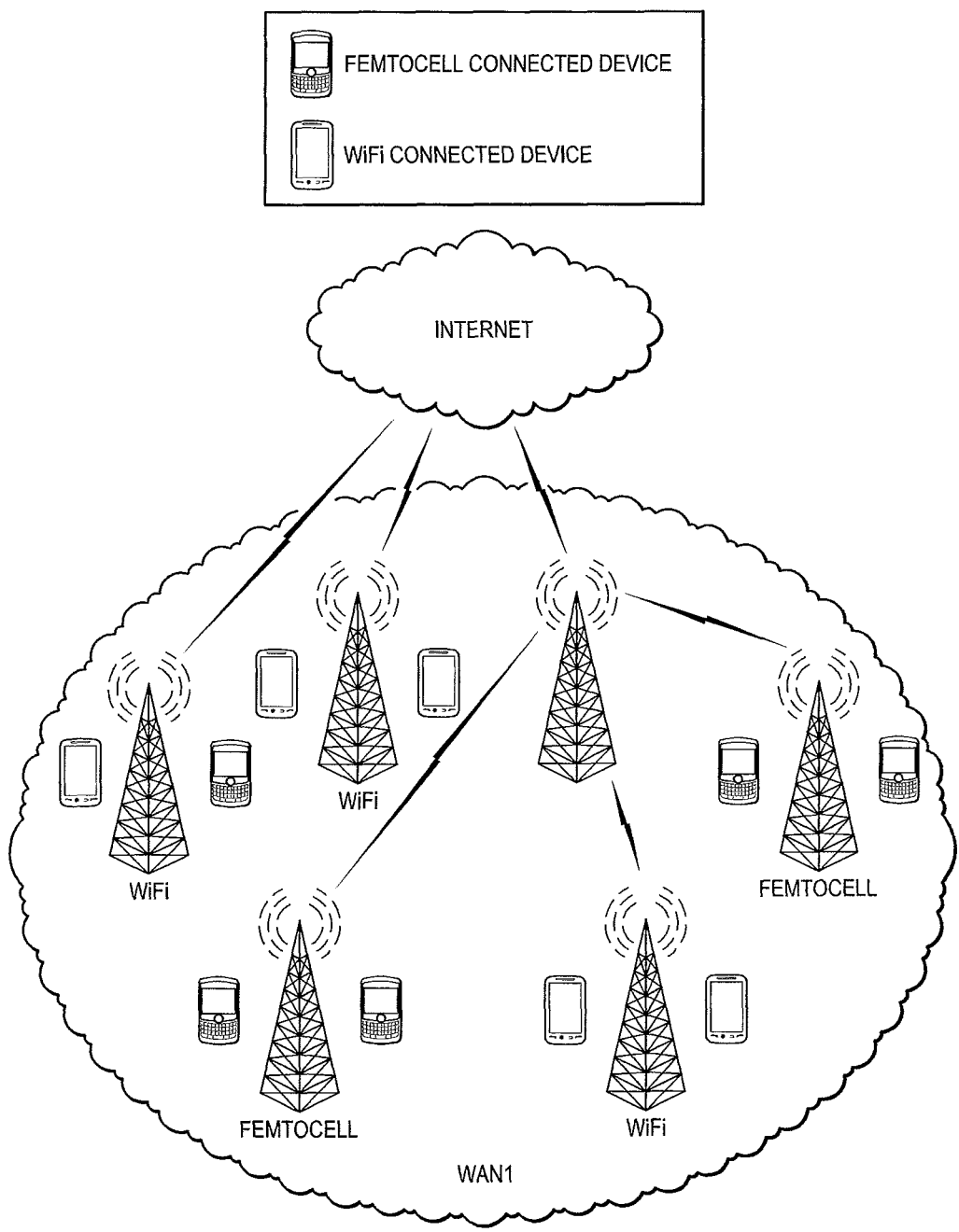
FIG. 1 is a diagram of LTE femtocells and WiFi access points.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Embodiments are described herein in the context of an LTE wireless network or system, but can be adapted for other wireless networks or systems.

An unlicensed band may be considered to be any portion of the radio spectrum whose use is not restricted through a spectrum licensing approach. In particular, certain bands in the 5 gigahertz (GHz) range are known as the Unlicensed National Information Infrastructure (U-NII). Bands covered by the U-NII include U-NII Low (U-NII-1), U-NII Mid (U-NII-2), U-NII Worldwide, and U-NII Upper (U-NII-3). The frequency range for U-NII Low is 5.15 to 5.25 GHz. With U-NII Low, the use of an integrated antenna is required, and power is limited to 50 milliwatts (mW). The frequency range for U-NII Mid is 5.25 to 5.35 GHz. With U-NII Mid, a user-installable antenna is allowed, subject to dynamic frequency selection (DFS), and power is limited to 250 mW. The frequency range for U-NII Worldwide is 5.47 to 5.725 GHz. With U-NII Worldwide, both outdoor and indoor use are allowed, subject to DFS, and power is limited to 250 mW. The frequency range for U-NII Upper is 5.725 to 5.825 GHz. With U-NII Upper, a user-installable antenna is allowed, and power is limited to 1 watt.

LTE air interfaces are becoming available in femtocells, which may have a comparable footprint to WiFi access points. Therefore, it may be appropriate to consider leveraging unlicensed bands for LTE operation in femtocell deployments. Such considerations may require an examination of all aspects of the LTE design to assess the suitability of LTE for unlicensed band use. Time division (TD) LTE may be assumed as a preferred duplexing mode for the unlicensed band, but frequency division (FD) may also be possible.

The introduction of carrier aggregation in LTE may provide an opportunity to use an unlicensed band as a secondary component carrier. By allowing the primary component carrier to carry the bulk of the signaling and control traffic and other essential licensed band features that cannot be easily replicated for operation in the unlicensed band, the design of LTE in unlicensed bands can be simplified.

It may be necessary to protect LTE transmissions from interference while LTE coexists with other technologies that are simultaneously in use in the unlicensed band. Similarly, for coexistence, the LTE transmissions may need to consider the interference possibly caused to other transmissions in the band.

Embodiments disclosed herein provide for a TD LTE transmission operating a secondary component carrier in an unlicensed band. The embodiments enable LTE operation to coexist with WiFi in the unlicensed band, as illustrated in FIG. 1. The embodiments enable unlicensed LTE operation with minor modifications to the TD LTE and carrier aggregation system designs and enable the coexistence of LTE HeNBs and WiFi APs operating in the unlicensed band without any explicit cooperation between the two systems.

The embodiments may not directly fit into the Release 10 carrier aggregation (CA) scheme, as described in 3GPP Technical Report (TR) 36.808, since use for non-contiguous CA is restricted to selected licensed FDD bands and all TDD bands. It may be expected that future releases of CA will include unlicensed bands as well. The embodiments disclosed herein provide concepts and guidelines for the evolution of CA to include unlicensed spectrum.

Figure 2:
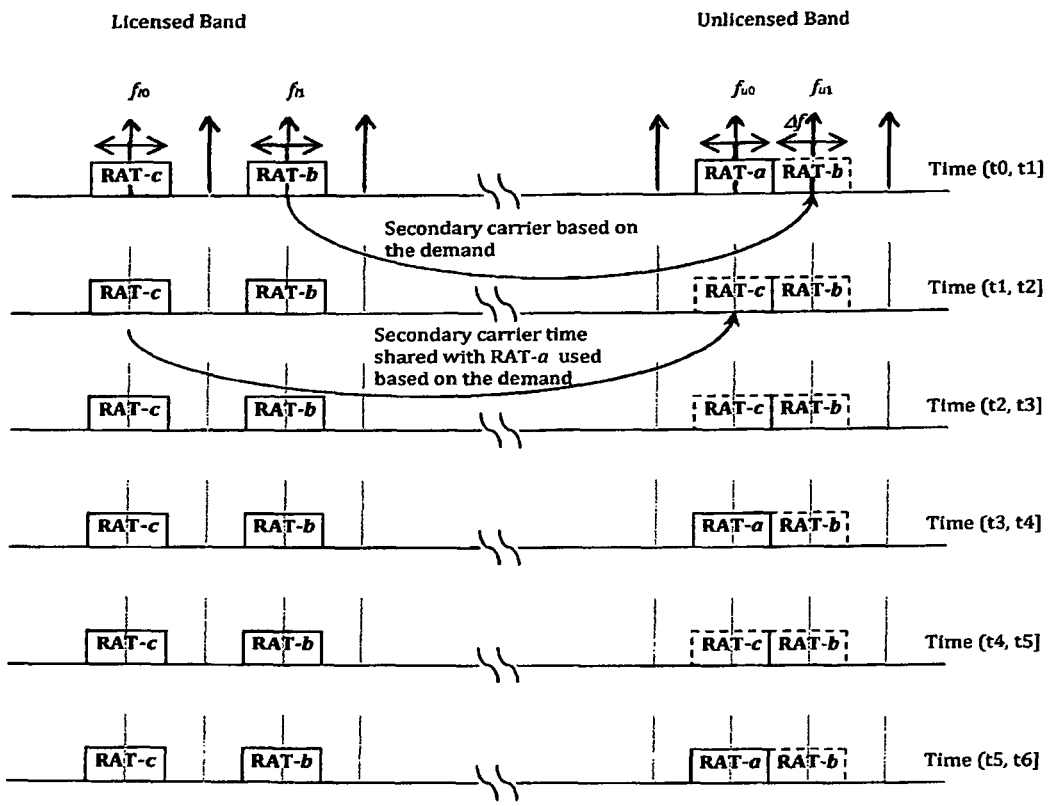
FIG. 2 depicts the coexistence of different radio access technologies on the same carrier frequency.

In general, two technologies can be called coexisting if they share the same frequency resources at different times or different frequency resources at the same time without causing significant interference to each other. As illustrated in FIG. 2, RAT-b, which is operating on a carrier frequency $f_{l1}$ in a licensed band (over a bandwidth of 2 $\Delta f$), may opt to have a second carrier in an unlicensed band if the available bandwidth is scarce to support the quality of service (QoS) requirements of the connected and/or incoming UEs and if bandwidth is available in an unlicensed band. In this example, RAT-a is operating in the unlicensed band. RAT-b may operate the carrier $f_{u1}$ as the secondary carrier if the resources in the band $f_{u1} \pm \Delta f$ are available. However, sometimes all the resources in the band $f_{u1} \pm \Delta f$ may not be utilized by RAT-b all the time, possibly resulting in a waste of resources. Instead, a RAT-c, which is operating on carrier frequency $f_{l0}$, may operate on $f_{u0}$ in the unlicensed band as a secondary carrier when in need of extra bandwidth. In this case, the same carrier frequency is shared with RAT-a in time. Both RAT-a and RAT-c can coexist on the same carrier frequency but at different times without affecting their basic functionality. However, it may be desirable for RAT-c to operate such that there is no significant degradation in RAT-a's operation. If it is assumed that RAT-a is not aware of RAT-c, then RAT-c may need to be cognizant of the resource usage and protocol structure of RAT-a. This type of coexistence is addressed by the embodiments disclosed herein.

In the embodiments disclosed herein, the TD LTE HeNB contains both the LTE air interface and the unlicensed TD LTE (U-TD LTE) air interface, with the former operating in the licensed band and the latter providing the excess channel bandwidth by leveraging the unlicensed band. Thus, the U-TD LTE may operate only as a secondary component carrier in the unlicensed band (i.e., without the assumption of a database), and may operate with centralized scheduling for downlink user data. Sharing access with WiFi and other unlicensed users is built into the frame structure.

By way of background information, a brief discussion will now be provided regarding unlicensed bands, WiFi, and TD LTE. Unlicensed bands are governed by regulatory restrictions for operation so as to allow coexistence of multiple technologies using the band. As an example, the transmit power restrictions for the U-NII Low band require indoor APs to operate at low power. In addition, Dynamic Frequency Selection (DFS) (in the radar bands only) and Transmit Power Control (TPC) are mandatory in portions of the band. While the radar band may be avoided, some means of meeting the TPC requirements may have to be provided for an LTE transmission.

Figure 3:
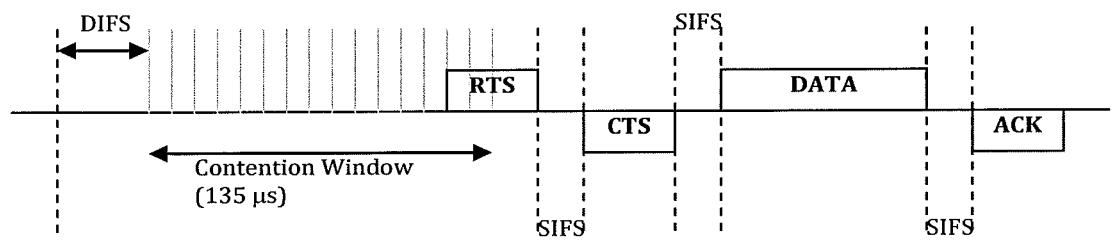
FIG. 3 is a diagram of IEEE 802.11 distributed coordination function operation.

The decentralized medium access control (MAC) function utilizing the Distributed Coordination Function (DCF) is shown in FIG. 3 and is the method that is commonly employed in commercially available APs. DCF operates in a Carrier Sense Multiple Access/Collision Avoidance (CSMA/CA) mode, thus implementing a back-off procedure prior to data transmission. MAC Service Data Units (MSDUs) are transmitted following the detection of the channel as being idle for a total period (a distributed inter-frame space or DIFS) of 34 microseconds plus a random time duration. A request to send (RTS) is optionally initiated by a WiFi device after waiting a randomly selected time after the channel is sensed to be idle for a duration equal to the DIFS. An RTS is not initiated if the data packet size is below a certain size indicated by RTS Threshold, which is a system-configurable parameter. In a case where an RTS is not required to be sent, the data packet is transmitted immediately after the channel is sensed to be idle for a duration indicated by the DIFS. The device transmits the data packet if a clear to send (CTS) frame is received after a time period indicated by short inter-frame space (SIFS). An acknowledgement is expected to be received after the transmission of the data packet with a delay of SIFS. Typical values of these timers and the frames are defined in FIG. 3. DCF is not required in a centralized scheduling setup where at any given instant only one station is allowed to transmit.

The IEEE 802.11a/n superframe is distinguished by the presence of a beacon frame that is transmitted by the AP at the beginning of the superframe and is used for timing synchronization by the stations attached to the AP. The beacon transmission period is denoted as Target Beacon Transmission Time (TBTT). The beacon transmission is delayed if there is a communication in progress. Only the AP generates beacons in the Basic Service Set (BSS) configuration comprising an AP and its connected stations. Such a configuration is the focus of the embodiments disclosed herein, but the embodiments are not limited to such a configuration.

DFS is used by the AP to select the frequency channel on which to operate. This procedure is standardized in IEEE 802.11h for the AP and the devices. The channel measurement procedure done by the AP is not standardized. DFS is mandated only for portions of the 5 GHz band where radar operation is also assigned. TPC is required as an operational feature for systems operating in portions of the 5 GHz band.

Figure 4:
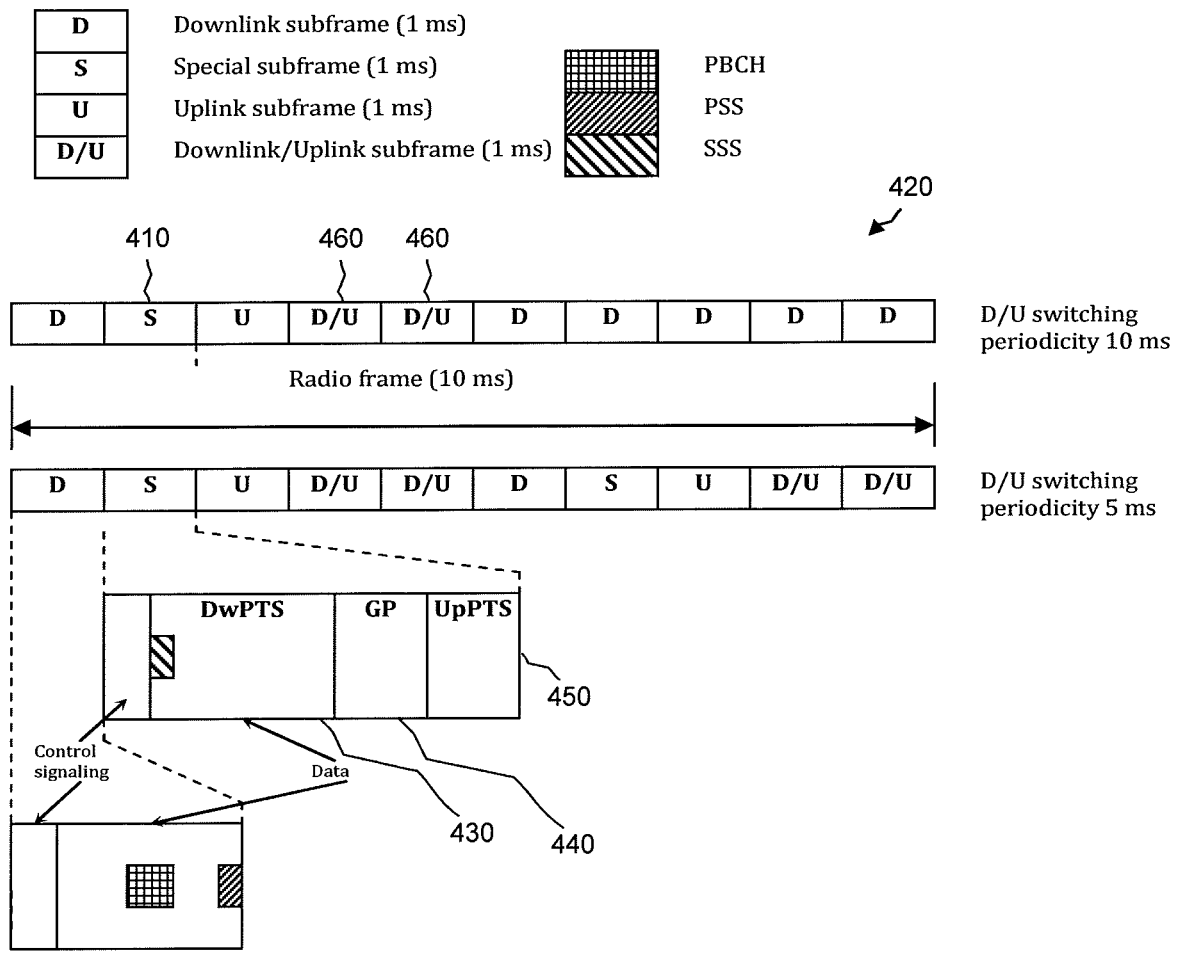
FIG. 4 is a diagram of TD LTE radio frame configurations.

The physical layer in LTE, being based on orthogonal frequency division multiple access (OFDMA), is similar to the physical layer in WiFi. The TD LTE Radio frame UL/DL configurations are given in FIG. 4. As illustrated, a special subframe S 410 is configured within a radio frame 420. Based on the UL/DL switching time, there are one or two special subframes S 410 within a frame 420. Two different UL/DL switching times are supported in TD LTE, 10 milliseconds (ms) and 5 ms. The special subframe S 410 consists of three fields, Downlink Pilot Time Slot (DwPTS) 430, Guard Period (GP) 440, and Uplink Pilot Time Slot (UpPTS) 450. GP 440 includes the switching time from DL to UL. The switching from UL to DL is achieved by appropriate timing advance at the UE. As shown in FIG. 4, the total length of DwPTS 430, GP 440, and UpPTS 450 is 1 ms. However, within the special subframe S 410, the length of each field may vary depending on the coexistence requirements with legacy TDD systems and supported cell sizes. By configuring the subframes 460 denoted as "D/U" as either for downlink or uplink, one can obtain seven different UL/DL configurations as tabulated in 3GPP Technical Specification (TS) 36.211. DwPTS 430 is similar to a regular but shortened downlink subframe and contains the reference symbols and control information. In addition, DwPTS 430 includes a primary synchronization signal (PSS) used for DL synchronization. A secondary synchronization signal (SSS) is transmitted during the last OFDM symbol of the previous subframe (subframe-0). UpPTS 450 occupies either one or two OFDM symbols. A synchronization reference signal (SRS) and a random access channel (RACH) are transmitted by the UE during the UpPTS 450. GP 440 can be set to 1-4 OFDM symbols or 9-10 OFDM symbols in length. The length of GP 440 is decided based on the cell size.

A limitation that may affect the deployment of LTE in the unlicensed band is that LTE is a frame-based medium access protocol designed for licensed band use. LTE's MAC frame structure requires that there be a synchronous transmission of the frame. Therefore, a random delay in transmission that is introduced by the CSMA/CA type of contention-based MAC protocol that is employed in WiFi may not be acceptable. Further, LTE transmissions are managed by the centralized scheduler in the eNB while WiFi transmissions rely on MAC procedures such as RTS, CTS and DCF because there is no centralized control. These are the major differences between LTE and WiFi in the context of operation in the unlicensed band, where the band may have to be shared with other WiFi users and where interference may occur due to other transmissions.

When a secondary component carrier (CC) is operated in the TD LTE configuration in 3GPP LTE Release 10, it may be necessary for the primary CC and the secondary CC to have identical DL/UL configurations to avoid causing excessive interference at the transceiver.

LTE femtocells are likely to proliferate in enterprise and residential deployments. Further, LTE TDD is becoming a mainstream standard as a complement to LTE FDD. Carrier aggregation has been introduced as a feature in LTE-Advanced and is specifically promoted as being of value for dense deployment of small base stations. CA can be applied in the context of LTE TDD as well. CA allows a variety of configuration features that support the use of an unlicensed band as a component carrier. For example, it is possible to have asymmetric configurations, with an anchor or primary CC (PCC/PCell) having both a downlink and an uplink channel and the additional secondary component carriers (SCC/SCell) configured for only downlink transmission. Thus it is possible to consider only downlink transmission on an unlicensed band SCC. Further, different power settings are permitted for the CCs, such that an SCC operating in the unlicensed band can be configured to meet the power level constraints for operation in that band. In addition, the PCC can also carry the majority of the medium access control (MAC) signaling, allowing a substantial simplification of operation of LTE on the SCC. These features of CA may motivate the consideration of a "light LTE" transmission in the unlicensed band. Further, since there is one MAC per user, and link adaptation is performed per CC, the LTE CA design may make it convenient to incorporate the unlicensed band DL on the SCC.

With this background information in mind, it may be seen that it may be likely for LTE femtocells to coexist with WiFi APs on the same 20 megahertz (MHz) channel. Therefore, it may be necessary to consider the coexistence of U-TD LTE with WiFi. It may also be necessary to consider the improvements that may be needed for coexistence with a different RAT on the same carrier. It may further be necessary to consider the concept of coexistence in the LTE design for unlicensed operation where, even within the context of a frame-based protocol, the band can be shared with other users. Some means of protection of the LTE transmission may be needed for dealing with the interference that may arise from a coexisting WiFi transmission.

The embodiments disclosed herein provide novel methods for U-TD LTE including the case where U-TD LTE and WiFi may coexist on the same carrier within an unlicensed band. The description herein addresses a scenario where an unlicensed carrier is used to offload downlink traffic from TD LTE operating over a licensed carrier. However, it is straightforward to extend this procedure to offload both the downlink and uplink traffic onto the unlicensed carrier.

It may be assumed herein that a femto eNB or HeNB is operating over a carrier frequency $f_L$ within a licensed band using TD LTE. In the same geographical area, a WiFi AP is operating over a carrier frequency $f_U$ within an unlicensed band. As the demand for bandwidth increases over $f_L$, the LTE eNB may offload some of the DL traffic onto the unlicensed carrier $f_U$ with minimal or no impact to the 802.11 operation on the carrier $f_U$. The data traffic to and from the UEs that are capable of operating over both the licensed and unlicensed bands may be offloaded to the unlicensed carrier. As referred to herein, a UE capable of operating over both the licensed and unlicensed bands may be considered to be a UE that is capable of transmitting and receiving over both the licensed and unlicensed bands and that may also be compliant with the modifications specified herein. Legacy UEs may still be kept on the licensed band.

One way of offloading the traffic is by enabling an SCC on $f_U$ and directing DL traffic to the SCC. However, since the operation of LTE on the unlicensed carrier should not cause any significant impact to the existing WiFi transmission, additional care may be needed when U-TD LTE is deployed on the SCC.

Since U-TD LTE may be initiated on an SCC with the desire to cause minimal or no impact to WiFi, the HeNB may need to know the WiFi operational parameters beforehand to appropriately transmit U-TD LTE subframes. The HeNB, with the help of a UE's measurements of the existing WiFi transmissions, may initiate the transmission of U-TD LTE frames on the SCC. Further details on the UE's feedback of WiFi-specific measurements are provided below. The U-TD LTE subframes may consist of additional special subframes (in addition to S subframes), as described below.

Some of the WiFi bands have power level restrictions, such as the U-NII Low band, whose power is limited to 50 mW. Such power restrictions are not of concern for implementing LTE in the unlicensed band, since LTE HeNBs meet the transmit power constraints required for unlicensed operation. The maximum transmit power for LTE HeNBs is less than 20 dBm for Type 1 Home Base Stations and less than 13 dBm for Type 2 Home Base Stations. These power levels are consistent with the unlicensed band requirements provided above.

The following assumptions may be made in the discussion hereinafter. The HeNB is assumed to be CA-capable and capable of operating over the licensed and unlicensed frequency bands. 20/40 MHz channelization is assumed to be consistent with IEEE 802.11. U-TD LTE is assumed to be enabled for use only as an SCC. The U-TD LTE unlicensed band secondary component carrier (U-SCC) is assumed to support only the U-Plane, and the C-Plane is assumed to be present only in the PCC. The U-SCC is assumed to be configured primarily for downlink operation, to supplement a primary LTE licensed band component carrier (PCC), while the uplink is supported only by the PCC. The U-TD LTE frame structure on the PCC and the U-SCC are assumed to be subframe and radio frame synchronized to minimize the impact to the current LTE standards. However, the UL-DL configuration may be different on the U-SCC and the PCC.

Figure 5:
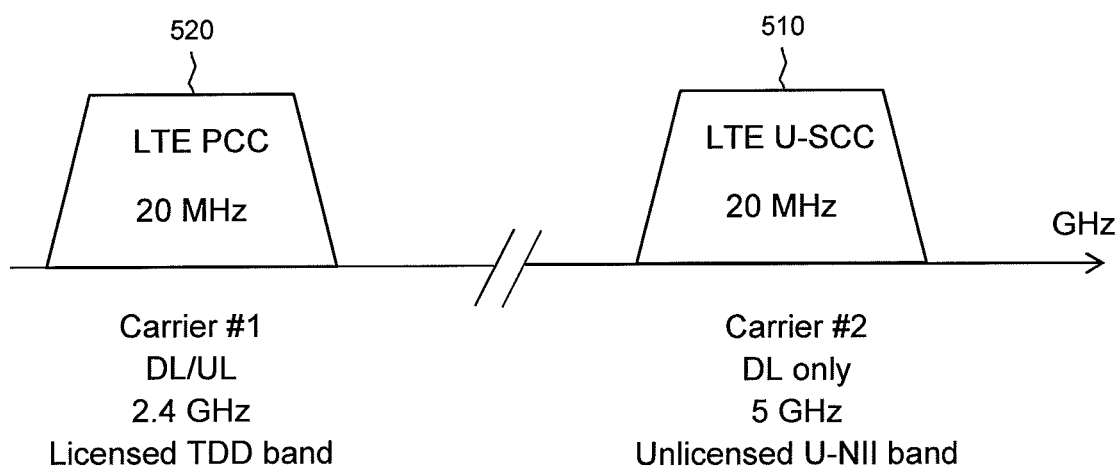
FIG. 5 is a diagram of a primary component carrier in a licensed TDD band and an unlicensed secondary component carrier in an unlicensed band.

The unlicensed band may constitute a secondary component carrier in the LTE transmission configuration, as illustrated with an example in FIG. 5. The SCC 510 may be added when traffic demands cannot be met by the PCC 520. The LTE bands identified for TDD operation are generally in various ranges between about 1850 MHz and about 2620 MHz. The PCC may be assumed to be located in one of these bands. The U-SCC may be located in the U-NII band at 5 GHz (e.g., 5725-5825 MHz in the US, a band that is used by wireless ISPs mostly in rural areas) or some other suitable unlicensed band. For example, a 20 MHz PCC at 2.5 GHz may be coupled with a 20 MHz U-SCC at 5 GHz.

Since a UE may already be camping on an LTE femtocell licensed band PCC, there may be no need for cell search, association, and authentication procedures to be performed to activate the unlicensed band SCC. Instead, on initial association of a UE with the HeNB, a U-TD LTE capable HeNB may transmit a query inquiring about the UE's U-TD LTE capability. This query may be transmitted on the PCC to a UE that is in the region of the HeNB. A U-TD LTE capable UE may respond affirmatively to this query. The HeNB may then update the UE's capability database for future use.

In an embodiment, the TD LTE PCC is leveraged to support the U-SCC. Several supporting functions for the U-SCC may be performed via the PCC. More specifically, device capability for U-TD LTE may be informed via the PCC. Also, the carrier frequency and system parameters of the U-SCC may be sent on system information broadcast on the PCC. Some of the system parameters, when changed, may be sent in dedicated radio resource control (RRC) signaling over the SCC. In addition, available channels and a power limit may be signaled via the PCC, and synchronization may be informed via the PCC. Also, the C-Plane may be exclusively with the PCC. Further, the U-SCC may not be used as a standalone LTE carrier. That is, UEs cannot attach to or access the LTE network through the SCC on the unlicensed band.

The bulk of the transmission, particularly the MAC signaling, may be carried by the PCC, thus leaving the U-SCC to be implemented in a simple manner for carrying LTE data packets and higher layer control signals on the downlink only. This approach simplifies U-TD LTE design since the restricted use of U-TD LTE only in the form of an SCC may require the design to cover only the support for user data while all the physical control signaling is performed on the PCC.

Protocol stack considerations will now be discussed. In particular, the MAC and physical layer features will now be considered. The physical layer of U-TD LTE is OFDMA-based and has 20 MHz channelization. Other channelization options are also available and may be suitable for use in the unlicensed band. Two scenarios were illustrated in FIG. 2 for the use of U-TD LTE. In one case, RAT-b was shown as the sole user on an unlicensed channel, in the context of two RATs operating on different unlicensed carriers at the same time. In another case, the channel was shared between RAT-a and RAT-c. The same physical layer frame format as used in licensed TD LTE may be employed with some modifications to support U-TD LTE operation in both cases.

The beacon that is transmitted in an 802.11 context provides the timing synchronization for the stations attached to the AP. In the context of TD LTE, there is already a physical layer timing synchronization signal being transmitted, and this may be utilized for timing synchronization on the U-TD LTE channel. An embodiment that provides a design enhancement in the case of coexistence with WiFi will now be provided.

Illustrations of U-SCC coexisting with 802.11 on the same 20 MHz channel are shown in FIGS. 6a, 6b, 7, and 8. The TD LTE UL-DL configurations defined in 3GPP TS 36.211 are used in the following examples. FIGS. 6a, 6b, 7, and 8 illustrate the coexistence of U-TD LTE with UL-DL configuration #3 with 802.11. The other UL-DL configurations can also be used to adjust the bandwidth usage between the two RATs. The 802.11 beacon interval is assumed to be at about 100 ms in the following description, and this corresponds to the 802.11 superframe duration. However, any other beacon interval may be equally applicable. The length of an LTE TDD radio frame is 10 ms, so there can be multiple LTE radio frames within an 802.11 superframe.

Figure 6A:
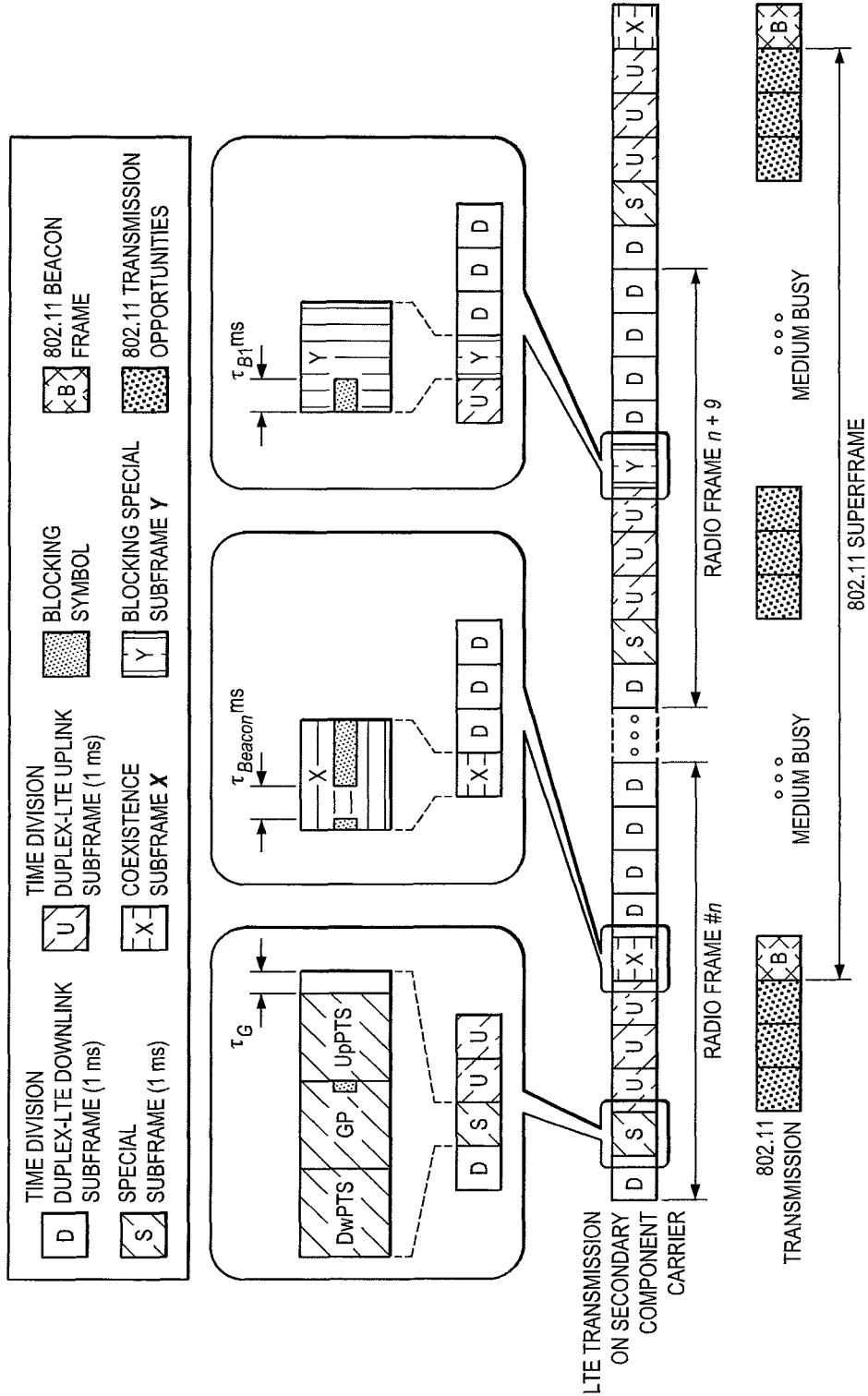
FIG. 6a is a diagram of LTE and WiFi transmissions where a WiFi beacon signal coincides with an LTE coexistence subframe, according to an embodiment of the disclosure.

In an embodiment, when the UE measurement feedback indicates that the WiFi beacon transmission occurs concurrently with a downlink subframe transmission on the PCC, as shown in FIG. 6a, the following procedure may be used to configure the transmission during the U-TD LTE subframe on the U-SCC. The procedure takes into account an 802.11 coexistence subframe (the LTE X subframe), a special blocking DL subframe Y, a modified U-TD LTE special subframe S, and a UL null subframe. In one embodiment, these subframes can be scheduled by the higher layers.

Regarding the 802.11 coexistence subframe (the LTE X subframe), as illustrated in FIG. 6a, the LTE HeNB configures the DL subframe, e.g. the sixth subframe in a radio frame, of every tenth radio frame (e.g., radio frames n, n+10, . . . etc.) whose transmission is concurrent with a WiFi beacon transmission as a special subframe X. For LTE to coexist with 802.11 transmissions on the same channel (20 MHz), the beacon frame transmission from the 802.11 AP should not be interfered with by the LTE transmission. For this reason, the LTE HeNB allots X subframes during the 802.11 beacon transmission. The X subframe is introduced only when there is an 802.11 beacon transmission in progress. Therefore, there may be a need for the LTE HeNB to be aware of the beacon transmission opportunities from the 802.11 AP. During the X subframe, there is no transmission during $\tau_{Beacon}$ ms, and during the rest of the subframe a blocking signal is transmitted. It may be assumed that the duration of a WiFi beacon transmission is less than 1 ms. $\tau_{Beacon}$ may include the duration of the beacon transmission from the 802.11 AP and any other time variation expected by the beacon transmission from the AP. It should be noted that the AP may delay the beacon transmission based on the ongoing packet transmission. The blocking signal is transmitted during the rest of the X subframe to avoid 802.11 device transmission in the immediately following subframes, which are dedicated to the U-TD LTE DL transmission. The beacon's TBTT parameter may be read by the HeNB in order to schedule the X subframe at the appropriate time.

Regarding the blocking DL subframe, the sixth subframe in the other radio frames is configured as a blocking subframe Y. A blocking signal is transmitted during the initial $\tau_{B1}$ ms of the subframe. The rest of the subframe is used for data transmission. (This is under the assumption that $\tau_{B1}$ is less than or equal to 3/15 ms). That is, subframes will occur at positions within subsequent LTE radio frames that correspond to the position within a previous LTE radio frame where a coexistence subframe was transmitted. If the WiFi AP is not scheduled to transmit a beacon signal concurrently with such a subsequent subframe, the LTE eNB transmits a blocking subframe Y. For example, in FIG. 6a, a coexistence subframe X is transmitted in the sixth subframe of radio frame #n. When the sixth subframe of radio frame n+9 occurs, no beacon signal is scheduled to be transmitted by the WiFi AP. Therefore, the LTE eNB transmits a blocking subframe Y in the sixth subframe of radio frame n+9. More details on the blocking signal format are provided below.

Figure 6B:
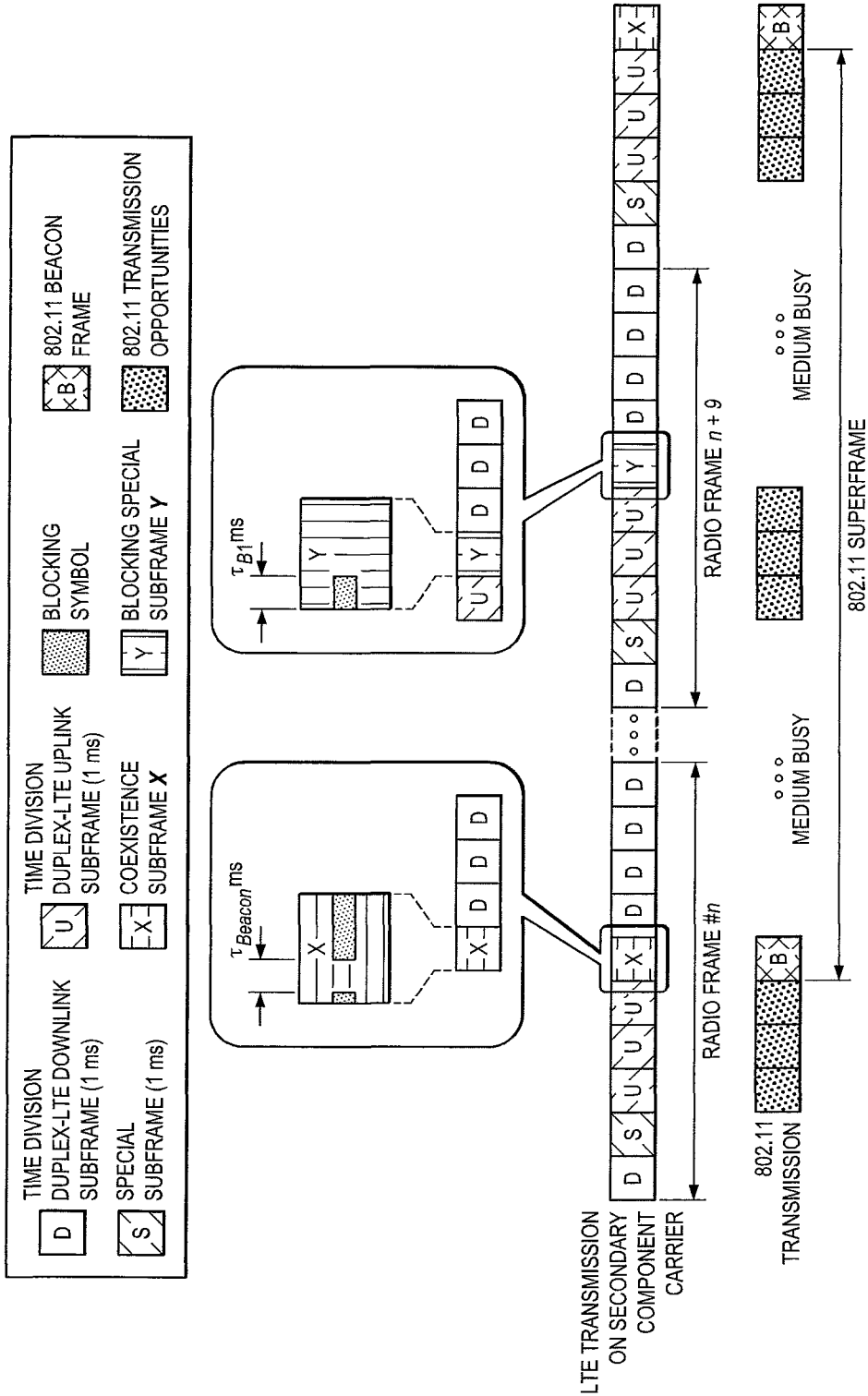
FIG. 6b is another diagram of LTE and WiFi transmissions where a WiFi beacon signal coincides with an LTE coexistence subframe, according to an embodiment of the disclosure.

The modified U-TD LTE special subframe S may optionally be taken into account in this procedure. That is, the TD LTE specific special subframe S may need some changes for coexistence. As depicted in FIG. 6a, the HeNB may transmit a blocking signal during the guard period (GP). This may be required to avoid any 802.11 device-initiated transmissions during the UpPTS. It should be noted that UEs may transmit RACH preambles or SRS transmissions during this period. In addition, it may be preferable to have a guard time at the end of the UpPTS, during which the LTE HeNB does not transmit on the DL. This guard time, indicated as $\tau_G$ in FIG. 6a should be slightly greater than the DIFS. The setting of these parameters may depend on the various S subframe configurations defined in 3GPP TS 36.211. Alternatively, as depicted in FIG. 6b, the UpPTS may be set to one OFDM symbol and no SRS transmission may be scheduled on the U-SCC. In this configuration, no changes may be required to the special subframe S for the coexistence.

Regarding the UL null subframe, the U-TD LTE configuration may require a minimum of one UL subframe during each U-TD LTE frame. Since U-TD LTE is designed only for the DL, the UL subframe is replaced with a null subframe.

The blocking symbol duration shown in FIG. 6a implies that there is no U-TD LTE data transmission during the period identified by the blocking symbol.

Figure 7:
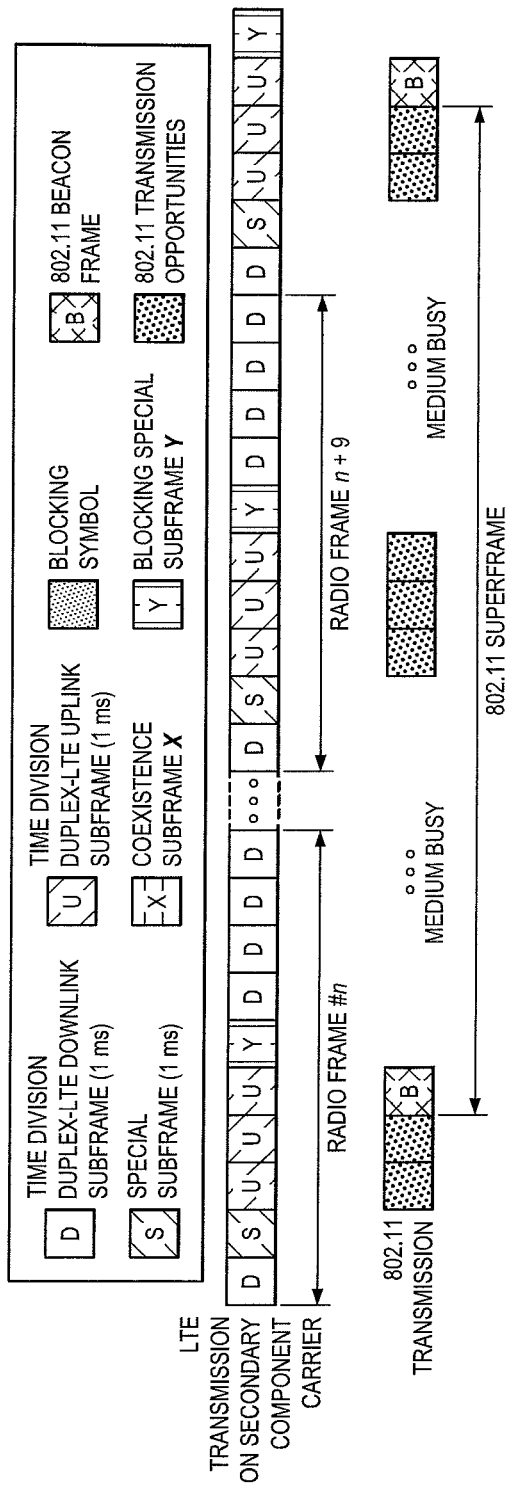
FIG. 7 is a diagram of LTE and WiFi transmissions where a WiFi beacon signal coincides with an LTE uplink subframe, according to an embodiment of the disclosure.

FIG. 7 illustrates a coexistence scenario when the WiFi beacon transmission is concurrent with the UL subframe of the TD LTE subframe boundary on the PCC. In this case, the coexistence subframe X may not be required.

Figure 8:
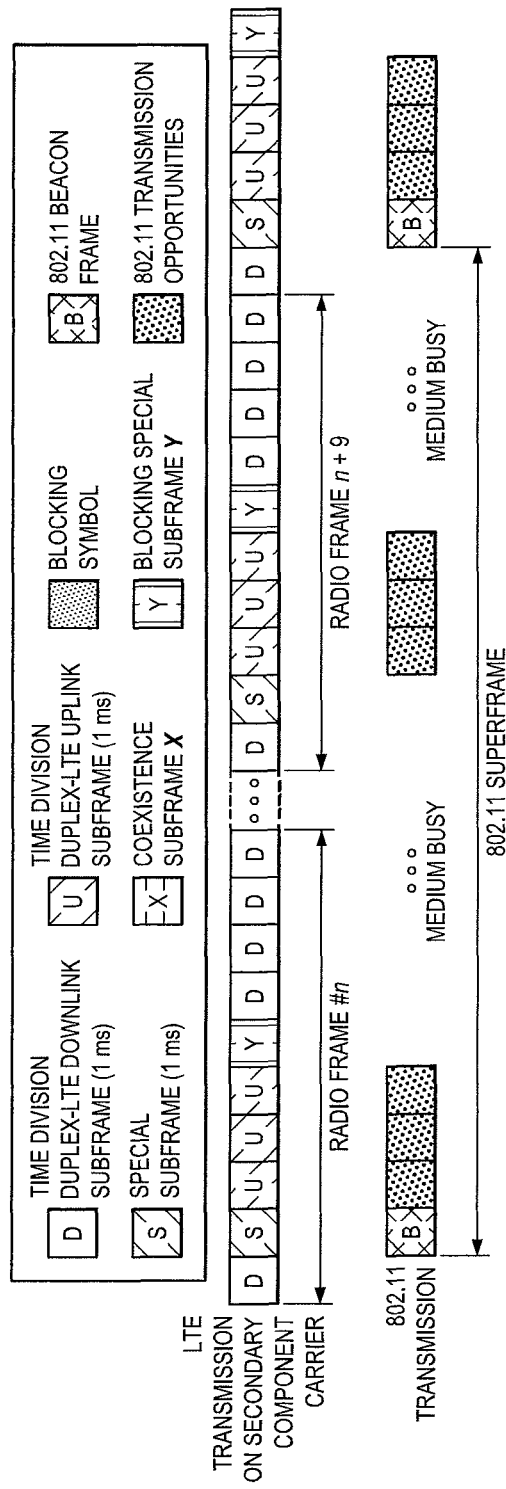
FIG. 8 is a diagram of LTE and WiFi transmissions where a WiFi beacon signal coincides with an LTE special subframe, according to an embodiment of the disclosure.

FIG. 8 illustrates a coexistence scenario when the WiFi beacon transmission is concurrent with the special subframe S of the U-SCC. In this case, the special subframe S may require some changes to allow the WiFi beacon transmission. Based on which part of the S subframe the WiFi beacon aligns with, DwPTS, GP, and UpPTS may be configured as blank. That is, if the WiFi beacon aligns with the DwPTS, no DL transmission may be scheduled during the DwPTS. In this scenario, the primary synchronization signal (PSS) and the broadcast channel (BCH) are not transmitted on the U-SCC.

If the WiFi beacon aligns with the UpPTS, the UpPTS can be configured such that no LTE UL transmission is expected during the UpPTS. That is, the system information block (SIB) can be set such that UEs do not transmit the SRS or the RACH. Therefore, a WiFi AP can transmit the beacon during this time. However, this is only done during every 10th radio frame. If the WiFi beacon is not concurrent with the transmission of the fourth OFDM symbol of the special subframe, the PSS can be transmitted as usual.

Another alternative is to select the WiFi carrier whose beacon transmission does not collide with the S subframe. Yet another alternative is to offset the subframes on the PCC and U-SCC if the WiFi beacon transmission collides with the S subframe.

Figure 9:
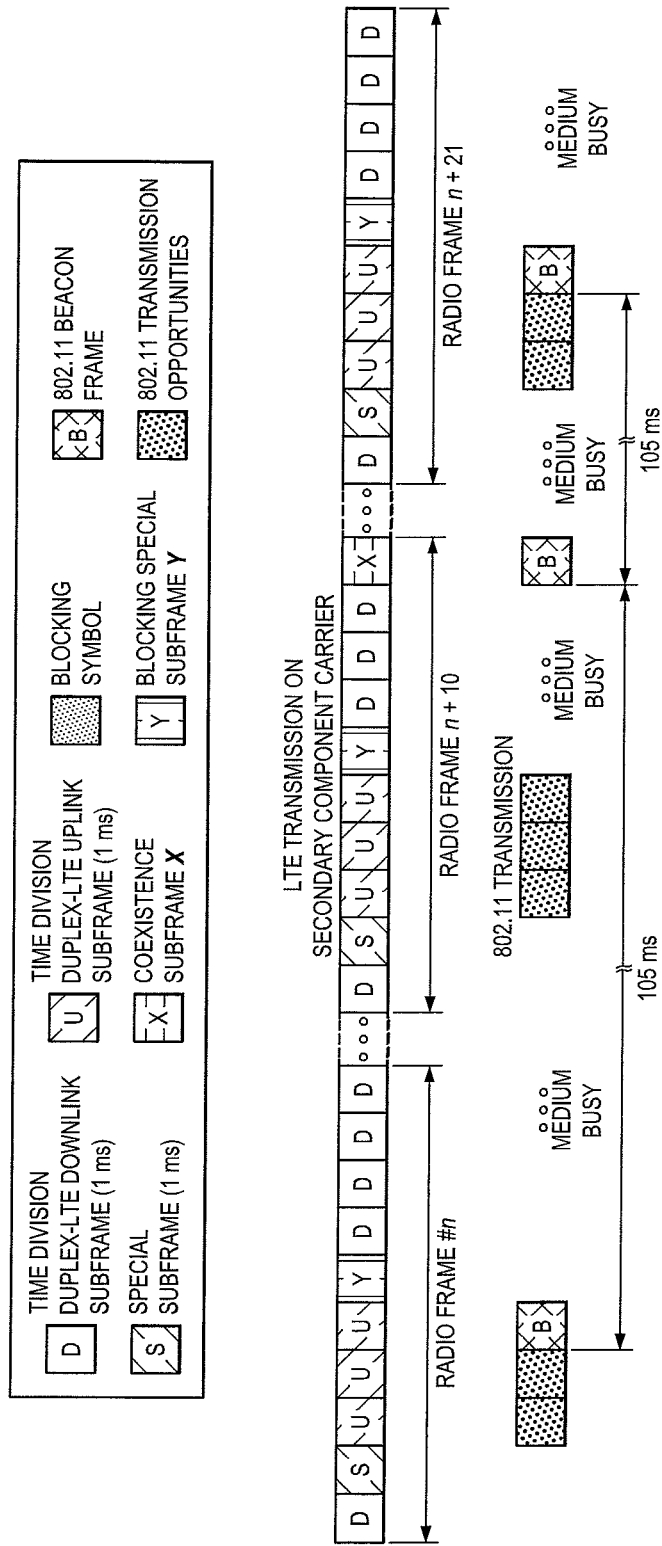
FIG. 9 is a diagram of U-SCC and 802.11 transmissions on the same carrier when the target beacon transmission time is not a multiple of 10 milliseconds, according to an embodiment of the disclosure.

The above discussion has assumed that the TBTT is a multiple of 10 ms, but the above procedures can be generalized for other cases. If the TBTT is not a multiple of 10 ms (i.e., one LTE radio frame), the beacon transmission may not always align with the same type of subframe, namely a downlink, uplink, or special subframe. In such cases, the LTE HeNB may need to schedule the special blocking transmissions as suggested in FIGS. 6a, 6b, 7, and 8 based on specific radio frames. For example, if the TBTT is 105 ms instead of 100 ms, and if a beacon is known to be aligned with subframe #4 of radio frame n, then scheduling of blocking symbols may be performed according to FIG. 6a during subframe #9 of radio frame n+10. This scenario is depicted in FIG. 9.

In general, if a beacon occurs during the mth subframe of the nth radio frame, then the future subframes ⌈mod(n*10+m+lp,10)+0.5⌉ in radio frames ⌊(n*10+m+lp)/10⌋ are configured as suggested in FIGS. 6a, 6b, 7, and 8 based on whether the subframe is assigned to a DL or UL or Special subframe transmission, respectively. Here p indicates the TBTT expressed in ms. l indicates the lth beacon transmission. ⌊x⌋ and ⌈x⌉ indicate the largest integer not greater than x and smallest integer not less than x, respectively. Therefore, the HeNB should be aware of the TBTT and also one specific beacon transmission to start the synchronization process. These parameters may be obtained via UE feedback, or the HeNB may measure these parameters.

As described above, the channel resources should be blocked by the HeNB such that all the WiFi devices sense a busy medium while U-TD LTE is using the channel. For effective blocking of the channel, the transmit power of the LTE transmissions should meet a certain criterion. It may be assumed that the WiFi device detects a busy medium by measuring the average received signal power. It should be noted that these methods may be at least partially dependent on the implementation.

The transmission power over the blocking symbols and downlink transmission may be adjusted such that the busy medium detection criterion at the WiFi device is satisfied. For example, a WiFi device may sense the transmission medium over the carrier frequency $f_U$ and decide to transmit a packet if the medium is determined to be vacant for a DIFS time period. The channel sensing may include measuring the received power over 20 MHz. The power measurement P may be averaged over a finite duration of time.

$(P_i \geq \eta)$

The threshold $\eta$ is a design parameter and $P_i$ is the received power measured at the WiFi device-i. $P_i$ is compared to the threshold $\eta$. Therefore, the transmit power on the unlicensed carrier at the HeNB may be adjusted such that the DL transmission on U-SCC effectively blocks or avoids accidental WiFi packet transmission. Therefore, the HeNB may ensure that the data transmissions towards the UEs that are operating on U-SCC are spread over the available resources with sufficient transmit power to effectively block the WiFi transmissions.

It can be seen from FIGS. 6a, 6b, 7, and 8 that the WiFi beacon transmission may occur during an LTE subframe dedicated for downlink, uplink, or special transmission. Based on the scenario, different coexistence techniques as disclosed above may be enabled by the RRC/MAC of the HeNB. A specific coexistence technique may be enabled with the help of UE feedback. If the UE is capable of receiving 802.11 and LTE transmissions, the UE may be instructed to monitor the 802.11 transmissions and feed back the measurement report to the HeNB. The UE may be specifically asked to monitor the beacon transmissions from the 802.11 AP.

Figure 10:
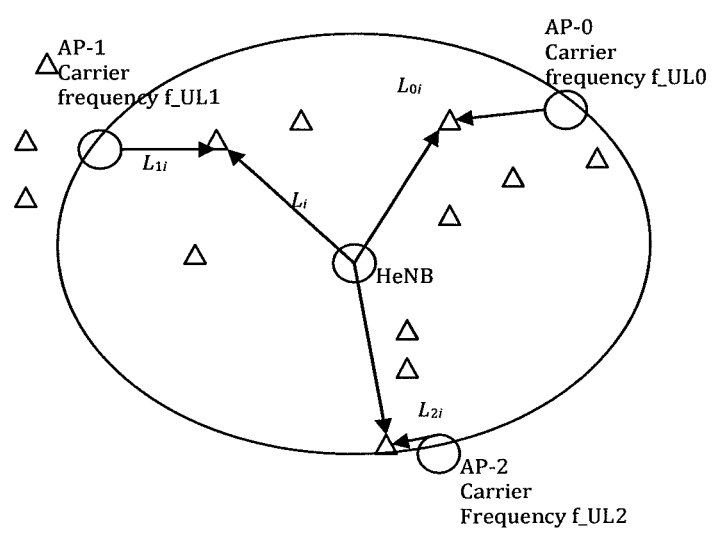
FIG. 10 is a diagram of UE WiFi measurement feedback to a HeNB.

As illustrated in FIG. 10, the HeNB may have, for example, three WiFi APs within its coverage area, and the WiFi APs may be naturally operating over different carriers to avoid interference. The HeNB may request measurement feedback from an active set of UEs on the unlicensed carriers. Based on the measurement feedback, the HeNB may select f_UL1 as the carrier frequency for the SCC.

Parameters that the UE may be requested to measure and feed back may include but are not necessarily limited to WiFi beacon timing, the maximum time variation of the beacon, path loss, WiFi beacon length parameters, WiFi system load, and the maximum size of the WiFi MAC payload.

Figure 11:
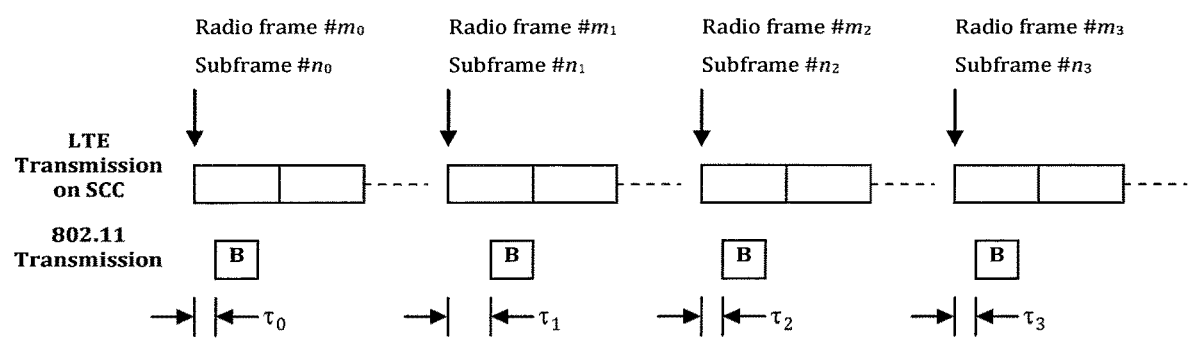
FIG. 11 is a diagram of WiFi beacon timing relative to an LTE subframe, according to an embodiment of the disclosure.

Since the 802.11 beacon transmission may vary within a time window, the WiFi beacon timing reception measurements with respect to an LTE subframe reception may be averaged over multiple transmission windows and reported back to the HeNB. That is, $$\tau = \frac{1}{N} \sum_{i=0}^{N-1} \tau_i$$

where $\tau_i$ is the ith measurement made with respect to the $n_i$th subframe of $m_i$th radio frame. The average number of subframes between two beacon transmissions can be measured as follows:

$$\bar{n} = \frac{1}{N} \sum_{i=0}^{N-1} (n_{i+1} - n_i) + 10 * (m_{i+1} - m_i)$$

where τ is measured as the time difference of arrival between the reception of the beacon and the nearest subframe edge. The subframe and radio frame number with respect to which these measurements are made may also be indicated in the report. FIG. 11 illustrates WiFi beacon timing relative to the LTE subframe.

With regard to the maximum time variation of the beacon, the WiFi beacon transmission may vary based on an ongoing WiFi packet transmission from a WiFi device. The maximum time variation can be measured and may be reported back to the HeNB as $$\tau_M = \max_i \{\tau_i\}$$

The UE may also measure and report the path loss L with respect to the WiFi AP, the average length and the maximum length of the WiFi beacon, the maximum MAC payload size as set by the WiFi AP, and an indication of the WiFi system load. The WiFi system load might be determined by, for example, monitoring the WiFi medium busy periods.

Figure 12:
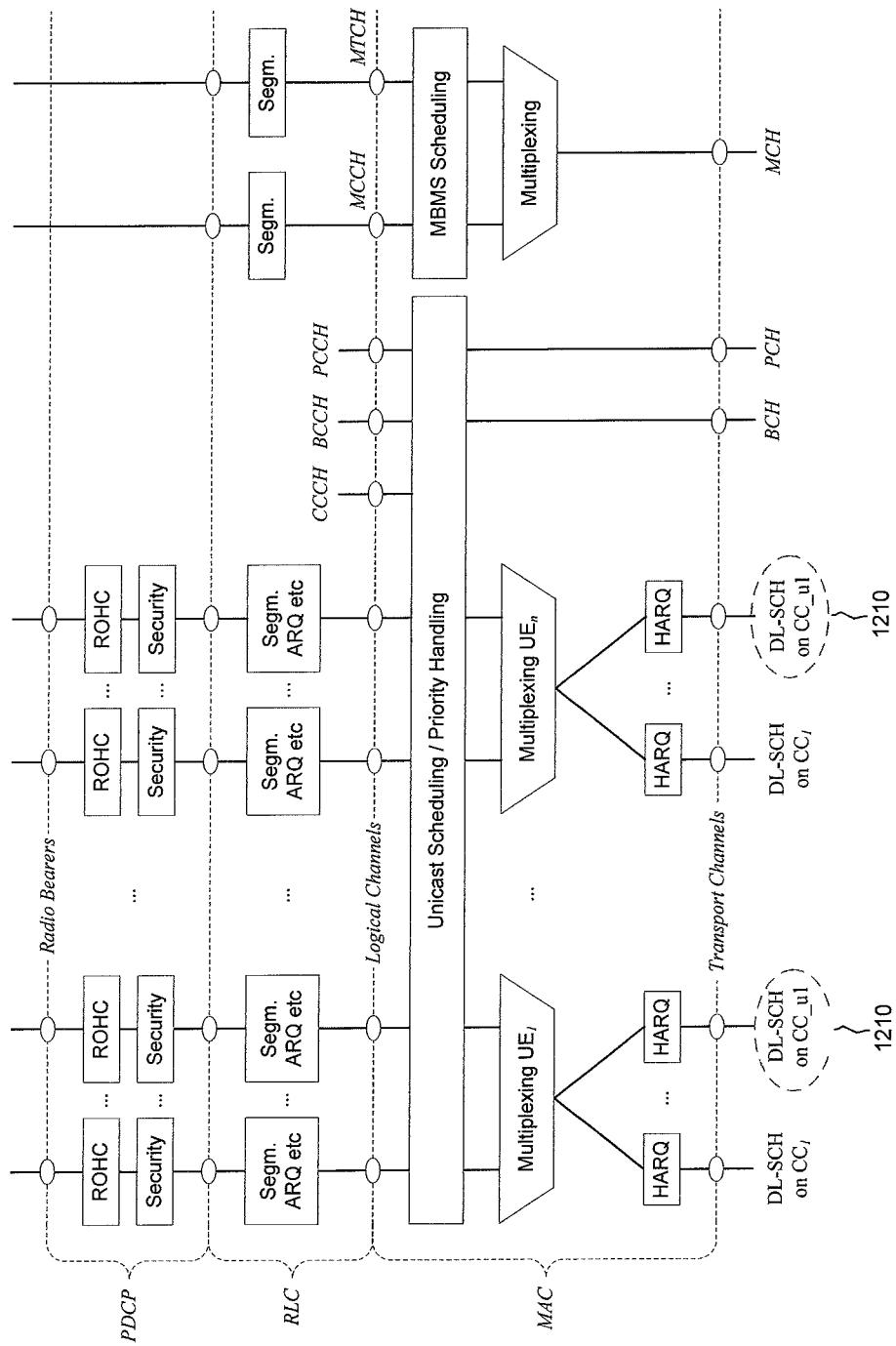
FIG. 12 is a diagram of a portion of the medium access control layer, according to an embodiment of the disclosure.

Concepts related to the MAC layer will now be considered. FIG. 12 illustrates a portion of the MAC layer, and elements 1210 represent a new functionality disclosed herein where a downlink SCH (DL-SCH) is on a component carrier unlicensed band.

Since there is one MAC per user, and link adaptation is performed per CC, the LTE CA design may make it convenient to incorporate the unlicensed band DL. The MAC DL SCH is supported on the U-SCC. The U-TD LTE scheme uses centralized scheduling similar to the TD LTE scheme. The HeNB scheduler treats the U-TD LTE channel as an additional resource and schedules selected transmissions on the U-TD LTE channel when the channel is available for use by LTE. With a centralized scheduling function controlling the allocation of spectrum to the UEs, there may be no need for the DCF and collision avoidance schemes used in IEEE 802.11. The MAC payload data unit (MPDU) size is not constrained as in IEEE 802.11. The start of the U-TD LTE transmission may not require any special medium access protocols in the case of coexistence in frequency when there are no other transmissions in the chosen band. For coexistence in time, there may be a need to ensure that the TD LTE frame is protected to avoid packet loss from initial collisions with ongoing transmissions. UEs operating on the U-SCC may monitor the DL packet loss or any other channel quality indicator and send that information back to the HeNB. Based on that information, the HeNB may decide to transmit some of the DL packets via the PCC.

In these embodiments, the need for carrier sensing and collision avoidance does not arise for interference from other U-TD LTE users in the same band, particularly because the transmissions are primarily downlink and managed by the scheduler. The design of U-TD LTE to operate in coexistence with WiFi on the same carrier is addressed elsewhere herein. Likewise, DCF is not needed because the transmissions are managed by the scheduler. Fairness of use to UEs in U-TD LTE can be managed by the scheduler. Fairness of use to other coexisting technologies is addressed elsewhere herein.

In an embodiment, the MAC frame format is the same as in TD LTE. However, it may be important to allow other RATs to access the spectrum while operating in coexistence mode. Instead of placing a minimum on the MPDU size, some of the subframes in the frame may be intentionally left blank to allow other non U-TD LTE unlicensed spectrum users access to the channel. However, the medium may need to be reclaimed in advance of the scheduled LTE transmission. This may be dealt with at the MAC layer by scheduling a blocking symbol in the physical layer. The blocking symbol duration $\tau_{B1}$ ms may act as a buffer zone to capture the channel for U-TD LTE transmission. When there is no WiFi or other transmission detected (i.e., the channel is fully available for U-TD LTE), this special subframe may be employed for initial capture of the channel. Once the channel is captured, the likelihood of WiFi interference is decreased, since WiFi relies on CSMA/CA and will avoid transmission as long as the channel is in use. Based on the scenarios defined in FIGS. 6a through 8, the MAC layer may initiate the blocking symbol transmission as needed.

The downlink data packets transmitted on U-SCC may be acknowledged on PCC UL subframes. In general, all the DL/UL control signaling to support the downlink transmission may be transmitted on the PCC. In addition, the LTE higher layers for both PCC and U-SCC may be maintained as is, since the actual air interface used for supporting an application or service is transparent to the higher layers.

In addition to the above protocol stack considerations, concepts regarding initiating the U-SCC, activating the U-SCC, and bandwidth sharing between WiFi and U-TD LTE will now be considered. As mentioned above, the UEs may be assumed to already be on a PCC that is licensed TD LTE. When there is demand for more DL resources, the LTE HeNB may instruct the RRC_ACTIVE UEs that can also detect 802.11 to search for 802.11 beacon transmissions over an unlicensed band in their vicinity. The channel search procedure may take into account information provided by the network about other eNBs in the vicinity using the unlicensed channels.

The UEs may be requested to do specific measurements, such as the average power of the beacon received over the carrier frequencies within the unlicensed band, the average traffic load as observed by the UEs, and the approximate time difference of arrival between the 802.11 beacon and the LTE subframes transmitted over the PCC. Alternatively, the HeNB may be equipped with means to scan and select the best channel.

Based on the UE measurement feedback, a carrier with the lowest beacon receive power and lowest traffic load may be selected as a potential U-SCC. The HeNB may notify the LTE network of the unlicensed channel that is in use to prevent other HeNBs in the vicinity from selecting the same channel.

The HeNB may communicate to a UE, in the signaling channel on the PCC, that the SCC is being set up in the unlicensed band for downlink operation. In addition, the HeNB may send the UE the transmit signal power for the unlicensed channel for the UE's uplink transmissions of control messages such as an acknowledgement/negative acknowledgement (ACK/NACK). The HeNB may start transmitting the U-TD LTE frames after appropriate synchronization of the transmissions over the U-SCC and the PCC.

Figure 13:
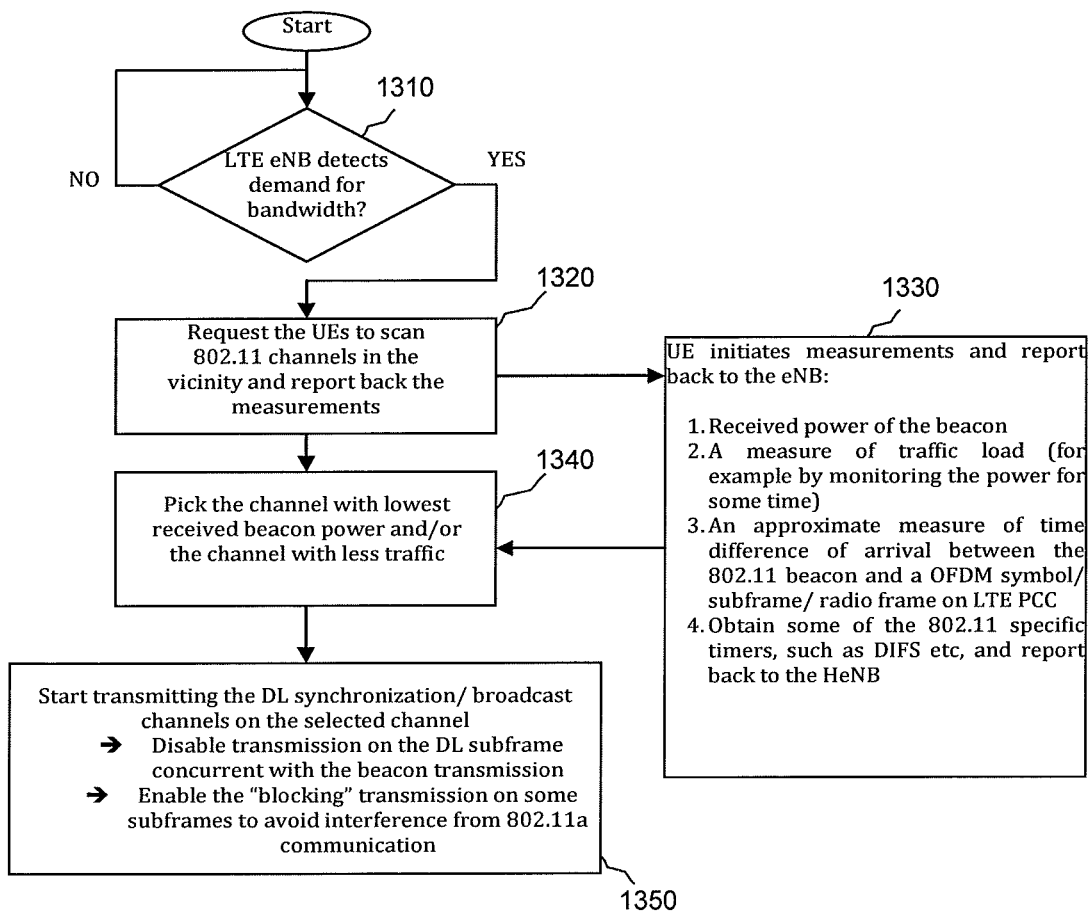
FIG. 13 is a flowchart illustrating LTE eNB unlicensed channel setup and UE measurements, according to an embodiment of the disclosure.

FIG. 13 depicts an embodiment of a UE feedback initiation procedure to enable an SCC in the unlicensed band. At block 1310, an LTE eNB attempts to detect a demand for bandwidth. If a demand for bandwidth is detected, then at block 1320, the eNB requests one or more UEs to scan the 802.11 channels in the vicinity and report back the measurements. At block 1330, a UE initiates measurements and reports back to the eNB. Information reported to the eNB may include the received power of the beacon, a measure of traffic load (for example, by monitoring the power for some time), and an approximate measure of the time difference of arrival between the 802.11 beacon and an OFDM symbol/subframe/radio frame on the LTE PCC. The UE may also obtain some of the 802.11 specific timers, such as DIFS, and report that information back to the eNB. At block 1340, the eNB picks the channel with the lowest received beacon power and/or the channel with less traffic. At block 1350, the eNB starts transmitting the downlink synchronization/broadcast channels on the selected channel. The eNB may also disable transmission on the downlink subframe concurrent with the beacon transmission and enable the "blocking" transmission on some subframes to avoid interference from 802.11a communication.

With regard to activating the U-SCC, the UE may optionally be asked to report measurements about the 802.11 APs within the vicinity, either during RRC connection establishment or immediately after RRC connection establishment and before or during S1 path establishment. Based on the feedback, an appropriate SCC that is already configured as a U-SCC may be activated by sending a MAC control element to the UE on the PCC. Subsequently, any Carrier Aggregation (CA)-capable UE attached to the network for the first time may be assigned DL resources on the U-SCC.

Figure 14:
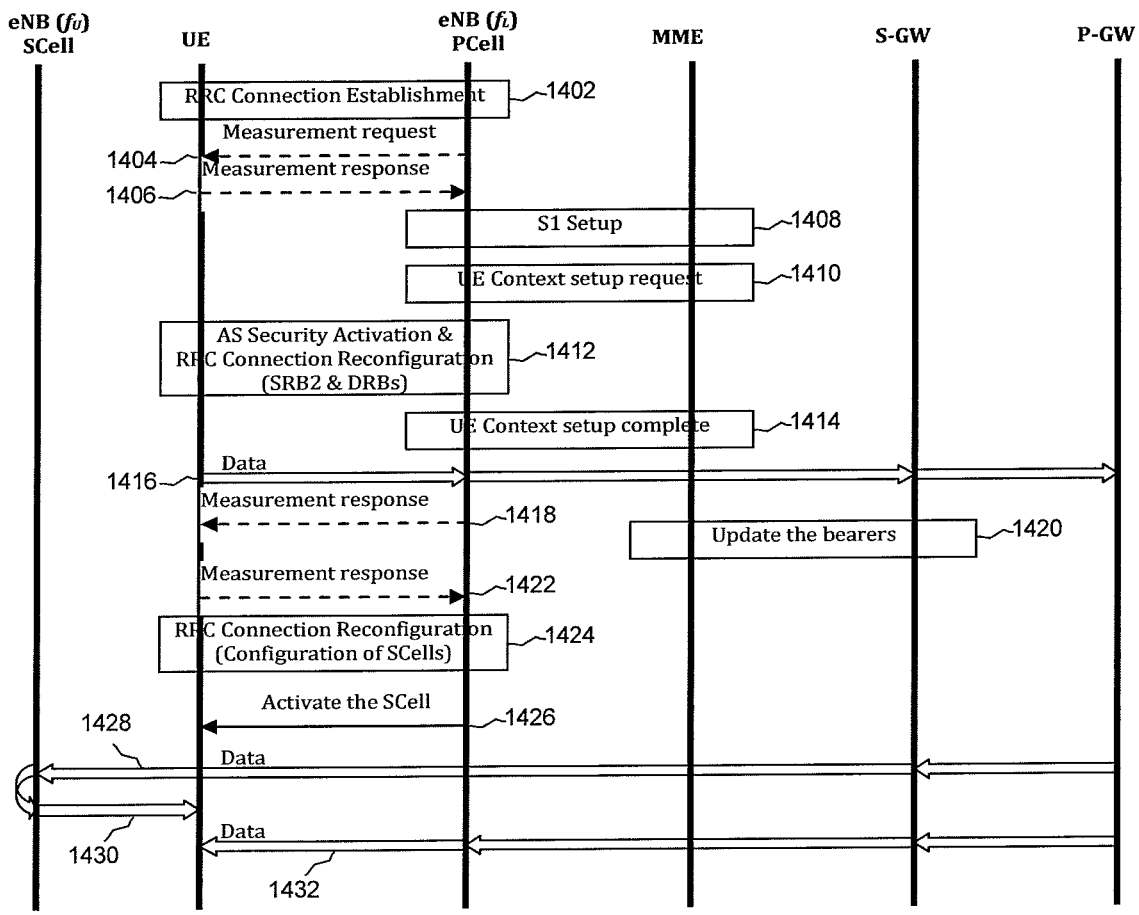
FIG. 14 is a flow diagram illustrating U-SCC activation, according to an embodiment of the disclosure.

This procedure is illustrated in FIG. 14. At event 1402, an RRC connection establishment procedure occurs between a UE and a PCell. At event 1404, the PCell sends a measurement request to the UE requesting from the UE the WiFi-specific parameters mentioned above, such as WiFi beacon timing and the time variation of the beacon. Event 1404 may be activated if there is a scarcity of DL and/or UL bandwidth and there are UEs in the system that are capable of operating in U-TD-LTE mode. At event 1406, the UE sends a measurement response to the PCell. At event 1408, an S1 setup procedure occurs between the PCell and a mobility management entity (MME). At event 1410, a UE context setup request occurs between the PCell and the MME. At event 1412, an AS security activation and RRC connection reconfiguration procedure occurs between the UE and the PCell. At event 1414, the UE context setup procedure between the PCell and the MME is complete. At event 1416, data is sent from the UE to the PCell to a serving gateway to a PDN gateway. At event 1418, a measurement response is sent from the PCell to the UE. At event 1420, the bearers are updated. At event 1422, a measurement response is sent from the UE to the PCell. At event 1424, RRC connection reconfiguration occurs with configuration of the SCells. At event 1426, the SCells are activated. At event 1428, data is sent from the PDN gateway to the serving gateway to the SCell. At event 1430, data is sent from the SCell to the UE. At event 1432, data is sent from the PDN gateway to the serving gateway to the PCell to the UE. Although two eNBs are shown in FIG. 14, one for the licensed band and one for the unlicensed band, only one eNB may be present.

With regard to bandwidth sharing between WiFi and U-TD LTE, Table 1 below shows the resource sharing on an unlicensed channel between 802.11 and U-TD LTE for the available UL-DL subframe configurations. The table is limited to a UL-DL switching periodicity of 10 ms. A similar table can be created for a 5 ms periodicity, but for a 5 ms periodicity, the bandwidth used for coexistence signaling may be increased. New TD LTE UL-DL configurations can be defined to extend the bandwidth sharing. It should be noted that the special subframe Y within the TD-LTE subframe structure uses 10% of the available time-bandwidth resources.

TABLE 1

| TD LTE Uplink-Downlink Configuration | Percentage bandwidth available for 802.11 | Percentage bandwidth available for TD LTE | Percentage bandwidth available for coexistence signaling (not including the special subframe) |
| --- | --- | --- | --- |
| 3 | 30 | ~50 | 10 |
| 4 | 20 | ~60 | 10 |
| 5 | 10 | ~70 | 10 |

Figure 15:
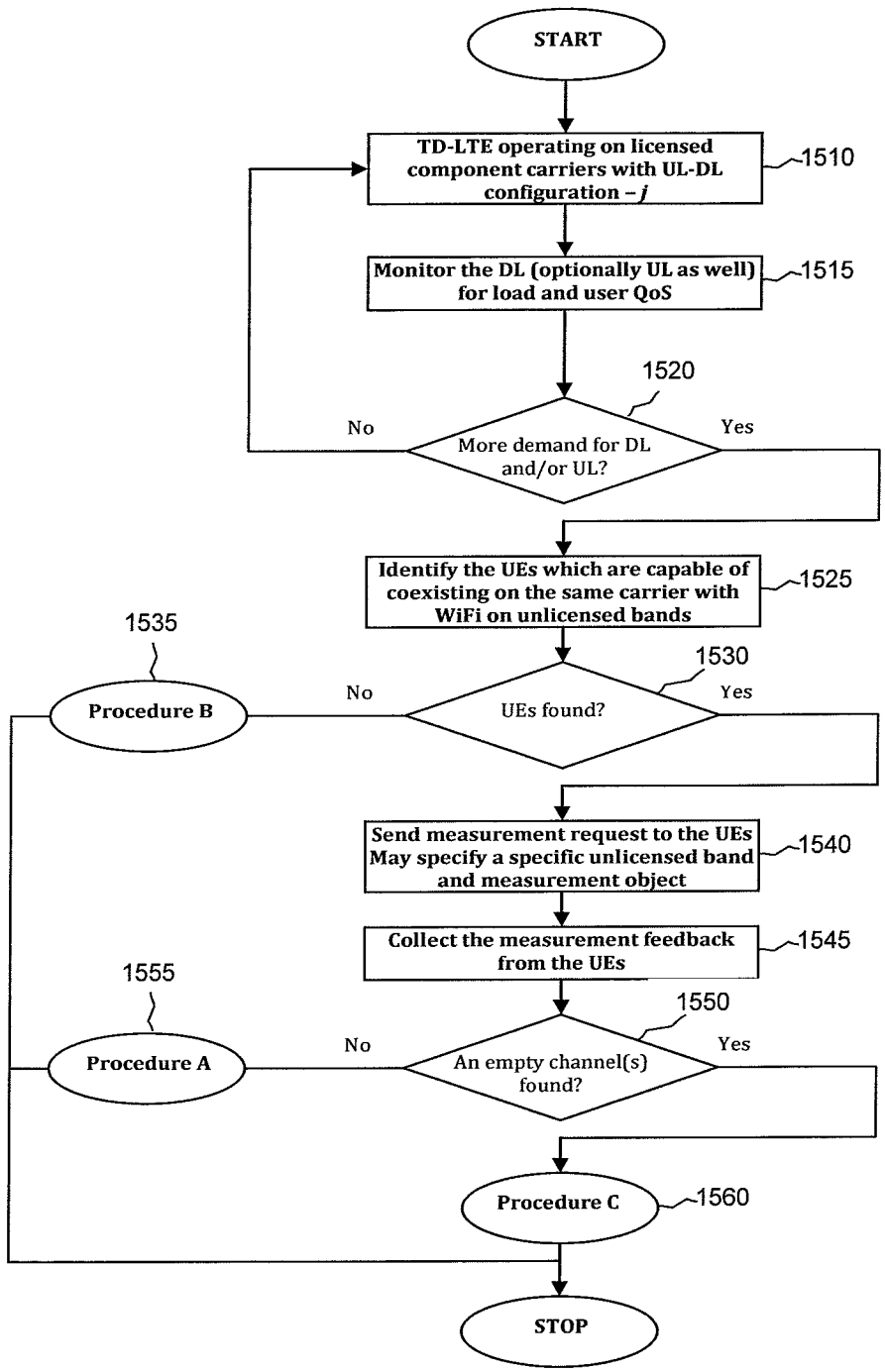
FIG. 15 is a flowchart illustrating an overall coexistence procedure with respect to HeNB operation, according to an embodiment of the disclosure.

The overall coexistence procedure with respect to HeNB operation is depicted in FIG. 15. As shown, a HeNB operating in U-TD LTE with a preconfigured UL-DL configuration continuously monitors the Quality of Service (QoS) of each service flow with respect to the promised QoS. If it is determined that extra bandwidth will improve the QoS with respect to the active UEs and also for the incoming UEs, the HeNB may try to capture a vacant carrier within a licensed or unlicensed band.

The HeNB may try to find UEs that are capable of coexisting with WiFi on the same carrier. If there are no UEs with this capability, the HeNB may initiate a search for carrier frequencies with the same or other licensed bands. It may be assumed that priority is given to find a carrier in an unlicensed band. The procedure can be modified to prioritize the licensed band, based on the configuration of the HeNB.

If there are many UEs that are WiFi-coexistence-capable, then the HeNB may initiate a UE measurement request for an empty WiFi carrier. Based on the measurement feedback, the HeNB may claim an empty or unused WiFi carrier, and Procedure C may then be followed. If an empty or unused carrier is not found, Procedure A may then be followed. The UEs may be further asked to send specific WiFi measurements as specified above to evaluate the possibility of sharing the bandwidth in time with WiFi. If there are no UEs that are WiFi-capable, a licensed SCC may be employed, as in Procedure B. Procedures A, B and C are described in detail below.

More specifically, at block 1510 in FIG. 15, a TD-LTE is operating on licensed component carriers with UL-DL configuration—j. At block 1515, the downlink is monitored for load and user QoS. The uplink may optionally be monitored as well. At block 1520, it is determined whether there is demand for more downlink and/or uplink bandwidth. If there is no such demand, the procedure returns to block 1510. If there is demand, then at block 1525, the UEs that are capable of coexisting on the same carrier with WiFi on unlicensed bands are identified. At block 1530, it is determined whether such UEs have been found. If such UEs have not been found, then at block 1535, Procedure B, which will be described in more detail below, is initiated. If such UEs have been found, then at block 1540, a measurement request is sent to the UEs. The measurement request may specify a specific unlicensed band and measurement object. At block 1545, the measurement feedback is collected from the UEs. At block 1550, it is determined whether one or more empty channels have been found. If no empty channels have been found, then at block 1555, Procedure A, which will be described in more detail below, is initiated. If one or more empty channels have been found, then at block 1560, Procedure C, which will be described in more detail below, is initiated.

Figure 16:
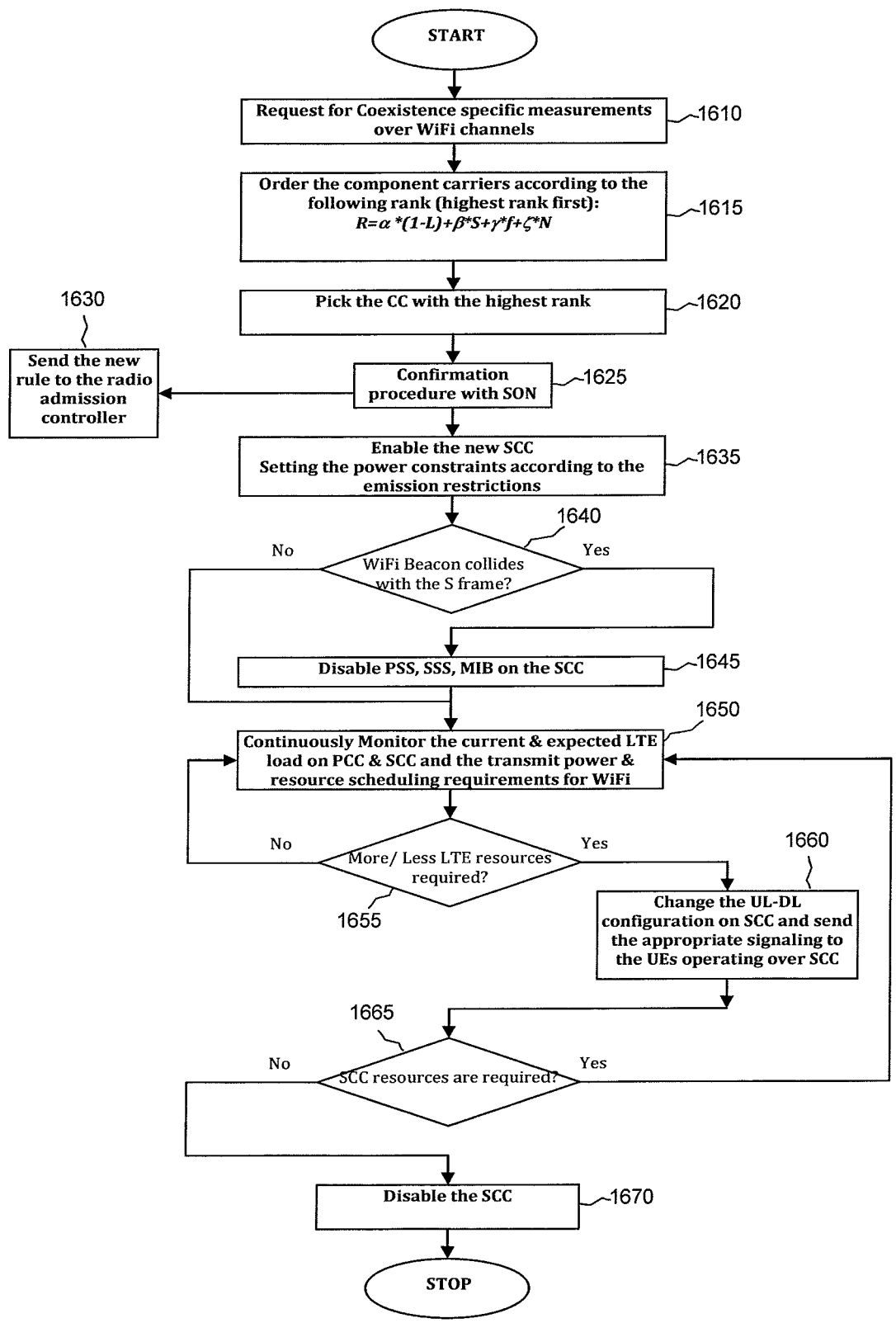
FIG. 16 is a flowchart illustrating a coexistence procedure for a channel shared with WiFi, according to an embodiment of the disclosure.

FIG. 16 illustrates an embodiment of Procedure A from FIG. 15, that is, a procedure for enabling U-SCC when there is an active WiFi transmission with available bandwidth to share. Based on the measurement feedback received from the UEs, the HeNB may rank the detected CCs in order of preference. For example, the ranking may be done according to the following procedure.

The rank, $R_i$ of the ith CC is determined as follows:

$$R_i = \alpha(1-L_i) + \beta^* S_i + \gamma^* f_i + \zeta^* N_i$$

where $\alpha$, $\beta$, $\gamma$ and $\zeta$ are scaling factors that may be implementation dependent. $L_i$ is the WiFi system load. $S_i$ is the expected LTE spectral efficiency (SPE) if CC-i is selected as the U-SCC. This is calculated based on the transmit power restrictions as specified by the spectrum regulations. $f_i$ is a measure of how much control over the bandwidth sharing is possible with the allowed UL-DL configurations. This can change if the LTE configurations are changed. $N_i$ is the number of attached UEs which are capable of operating in CC-i. This parameter may also include an operator-settable preference for specific unlicensed bands over the others.

$f_i$ may also include the maximum WiFi MAC payload. If the maximum MAC payload is smaller, the collision of WiFi packets with the LTE transmission can be kept low and the waste of bandwidth can be reduced.

The HeNB may select a CC with the highest rank and inform a self-organizing network (SON) entity or a network server, such as a HeNB gateway, about the selection. It may be assumed that the network server or SON entity manages the usage of the secondary carriers across the femto area. The U-SCC confirmation procedure will be further described with regard to FIG. 19. If the server positively responds to the HeNB, the HeNB may enable the secondary carrier according to the procedures described above. Further, the HeNB may continuously monitor the current LTE usage on the U-SCC and may reconfigure the DL-UL configuration.

More specifically, at block 1610 in FIG. 16, a request is made for coexistence specific measurements over WiFi channels. At block 1615, the component carriers are ordered according to the following rank (highest rank first): $R=\alpha*(1-L)+\beta*S+\gamma*f+\zeta*N$. At block 1620, the CC with the highest rank is picked. At block 1625, a confirmation procedure with a SON occurs. At block 1630, the new rule is sent to the radio admission controller as a result of the confirmation procedure with the SON. At block 1635, the new SCC is enabled and the power constraints are set according to the emission restrictions. At block 1640, it is determined whether the WiFi beacon collides with the S frame. If the WiFi beacon does collide with the S frame, then at block 1645, the primary synchronization signal (PSS), secondary synchronization signal (SSS), and master information block (MIB) on the SCC are disabled (not transmitted on the SCC). If the WiFi beacon does not collide with the S frame, block 1645 is bypassed, and at block 1650, the current and expected LTE load on the PCC and the SCC and the transmit power and resource scheduling requirements for WiFi are continuously monitored. At block 1655, it is determined whether more or less LTE resources are required. If not, the procedure returns to block 1650. If so, then at block 1660, the UL-DL configuration on the SCC is changed and the appropriate signaling is sent to the UEs operating over the SCC. At block 1665, it is determined whether SCC resources are required. If so, the procedure returns to block 1650. If not, then at block 1670, the SCC is disabled.

Figure 17:
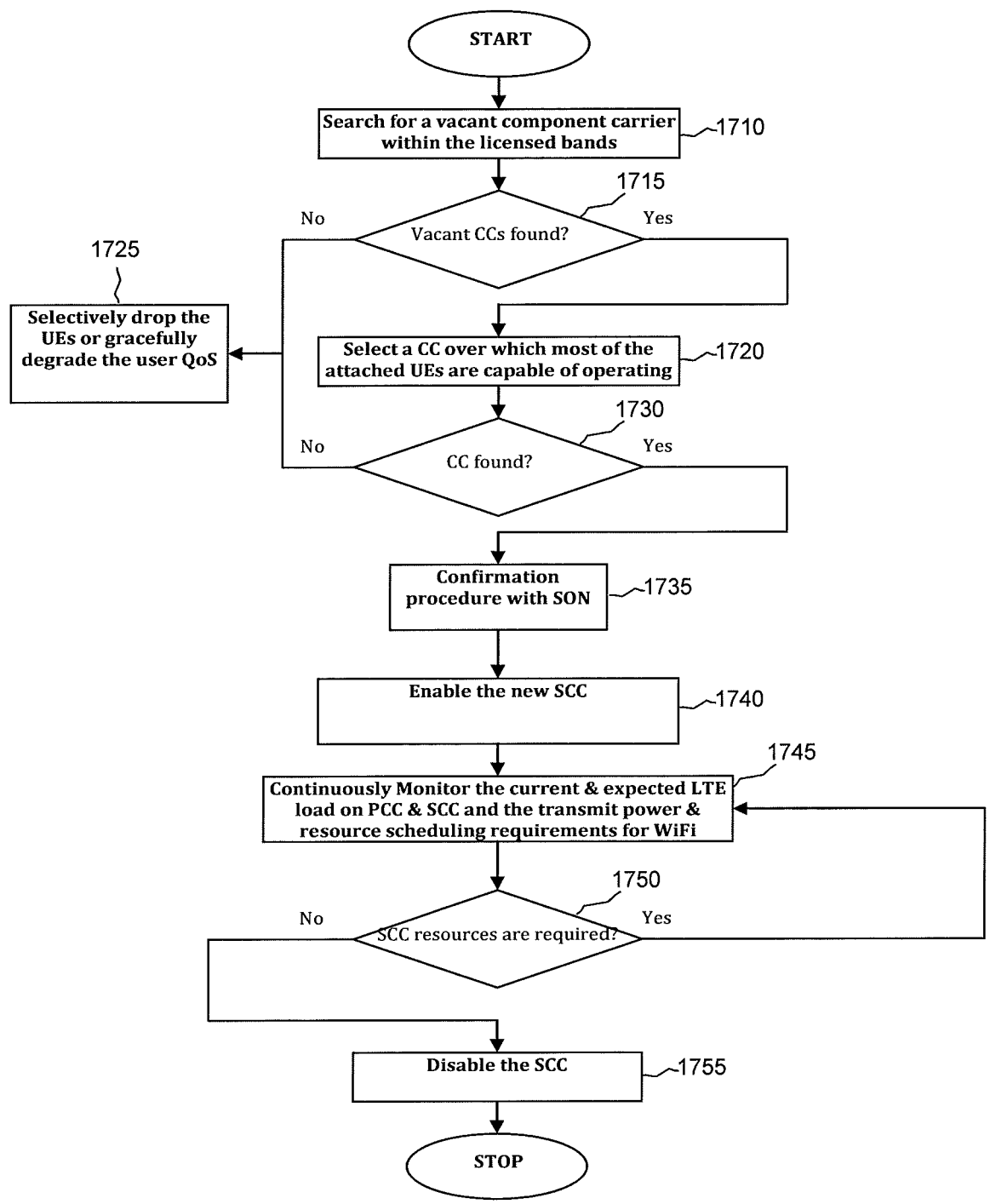
FIG. 17 is a flowchart illustrating a coexistence procedure for a conventional licensed TD LTE SCC, according to an embodiment of the disclosure.

FIG. 17 illustrates an embodiment of Procedure B from FIG. 15, that is, a procedure to search for an available CC within a licensed band if the HeNB does not find UEs that are coexistence capable. This figure describes the current mode of operation for the introduction of SCCs. More specifically, at block 1710 in FIG. 17, a search is performed for a vacant component carrier within the licensed bands. At block 1715, it is determined whether vacant CCs have been found. If so, then at block 1720, a CC is selected over which most of the attached UEs are capable of operating. If not, then at block 1725, the UEs are selectively dropped or the user QoS is gracefully degraded. At block 1730, it is determined whether a CC has been found. If not, the procedure returns to block 1725. If so, then at block 1735, a confirmation procedure with a SON occurs. At block 1740, the new SCC is enabled. At block 1745, the current and expected LTE load on the PCC and the SCC and the transmit power and resource scheduling requirements for WiFi are continuously monitored. At block 1750, it is determined whether SCC resources are required. If so, the procedure returns to block 1745. If not, then at block 1755, the SCC is disabled.

Figure 18:
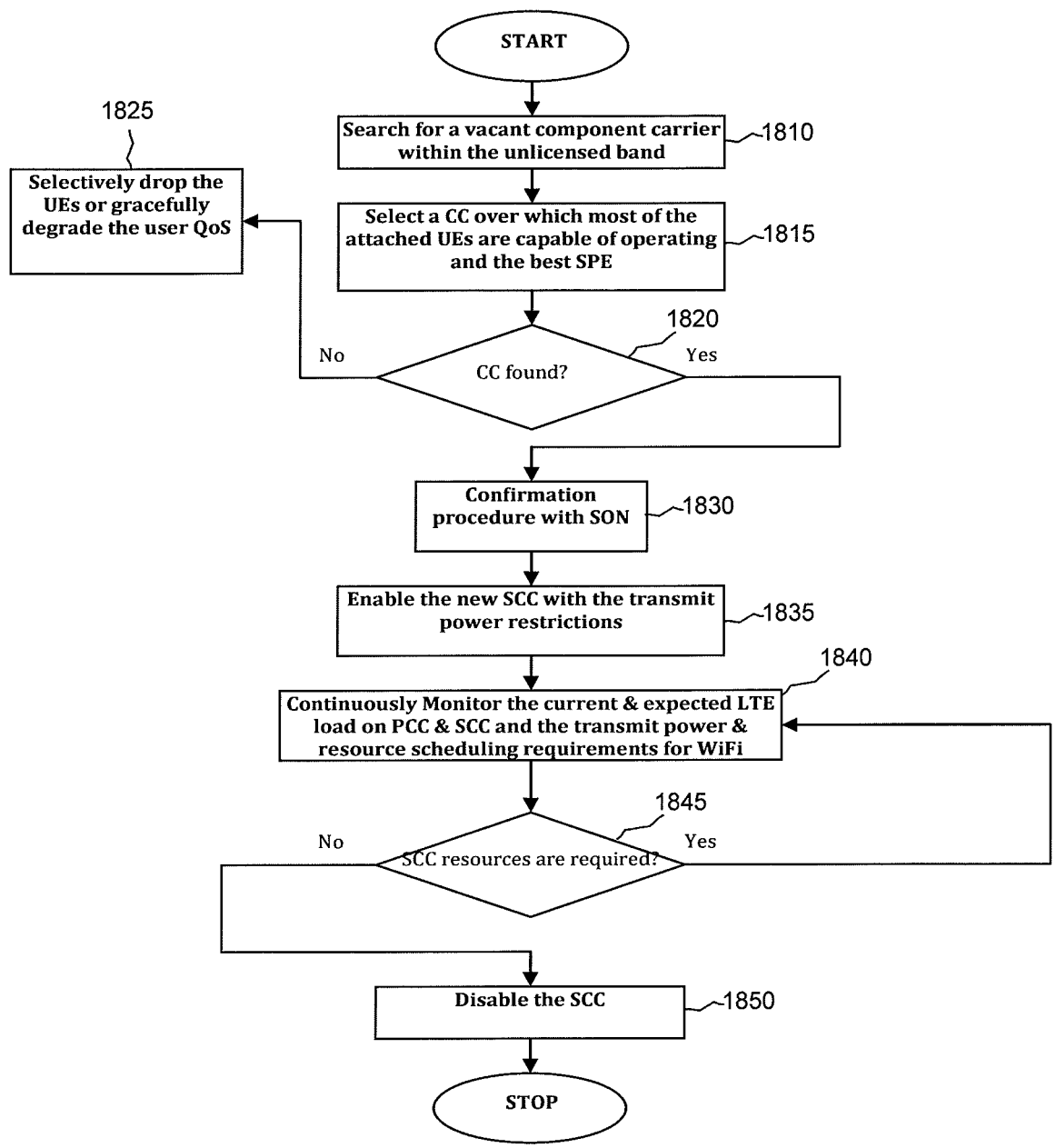
FIG. 18 is a flowchart illustrating a coexistence procedure for a U-SCC without WiFi transmissions, according to an embodiment of the disclosure.

FIG. 18 depicts an embodiment of Procedure C from FIG. 15, that is, a procedure to enable U-SCC on an unused unlicensed channel. At block 1810 in FIG. 18, a search is performed for a vacant component carrier within the unlicensed bands. At block 1815, a CC is selected over which most of the attached UEs are capable of operating and the best spectral efficiency (SPE). At block 1820, it is determined whether such a CC has been found. If not, then at block 1825, the UEs are selectively dropped or the user QoS is gracefully degraded. If so, then at block 1830, a confirmation procedure with a SON occurs. At block 1835, the new SCC is enabled with the transmit power restrictions. At block 1840, the current and expected LTE load on the PCC and the SCC and the transmit power and resource scheduling requirements for WiFi are continuously monitored. At block 1845, it is determined whether SCC resources are required. If so, the procedure returns to block 1840. If not, then at block 1850, the SCC is disabled.

Figure 19:
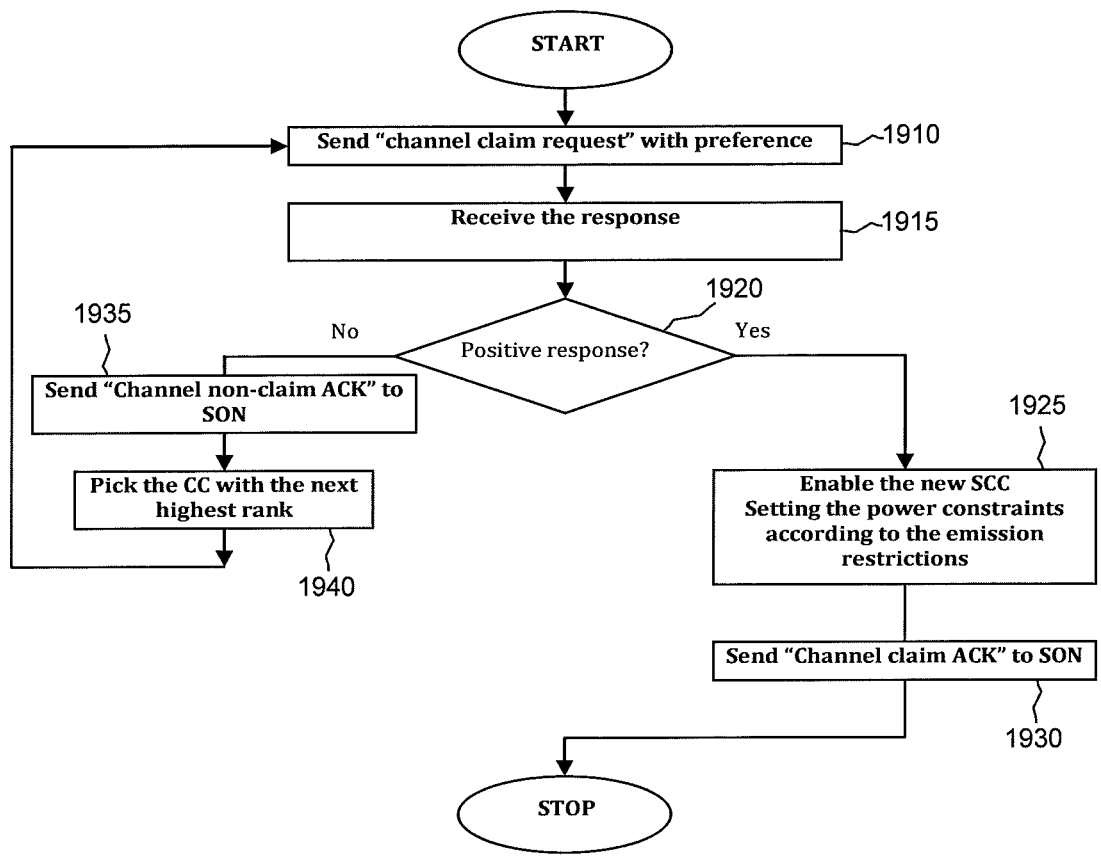
FIG. 19 is a flowchart illustrating a carrier claiming procedure, according to an embodiment of the disclosure.

The carrier claiming procedure illustrated in FIG. 19 may apply to the procedures of FIGS. 16-18. The procedure of FIG. 19 may avoid situations where two HeNBs claim the same CC as the U-SCC and thereby cause interference to each other. More specifically, at block 1910, a "channel claim request" with a preference is sent. At block 1915, the response is received. At block 1920, it is determined whether the response is positive. If the response is positive, then at block 1925, the new SCC is enabled and the power constraints are set according to the emission restrictions. At block 1930, a "channel claim ACK" is sent to the SON. If the response is not positive at block 1920, the procedure moves to block 1935, where a "channel non-claim ACK" is sent to the SON. At block 1940, the CC with the next highest rank is picked. The procedure then returns to block 1910.

The embodiments disclosed herein provide for the introduction of an unlicensed TD LTE secondary component carrier for use in a LTE-A carrier aggregation scenario. The embodiments enable the use of an enhanced LTE TDD frame structure that allows coexistence with WiFi or other unlicensed transmissions. The disclosed U-TD LTE frame structure is designed to adapt to allow the operation of other unlicensed users in the band and thus manage interference in the band. Other novel elements include a procedure for selection of an unlicensed channel for use as a U-SCC and for operating in a coexistence mode.

Figure 20:
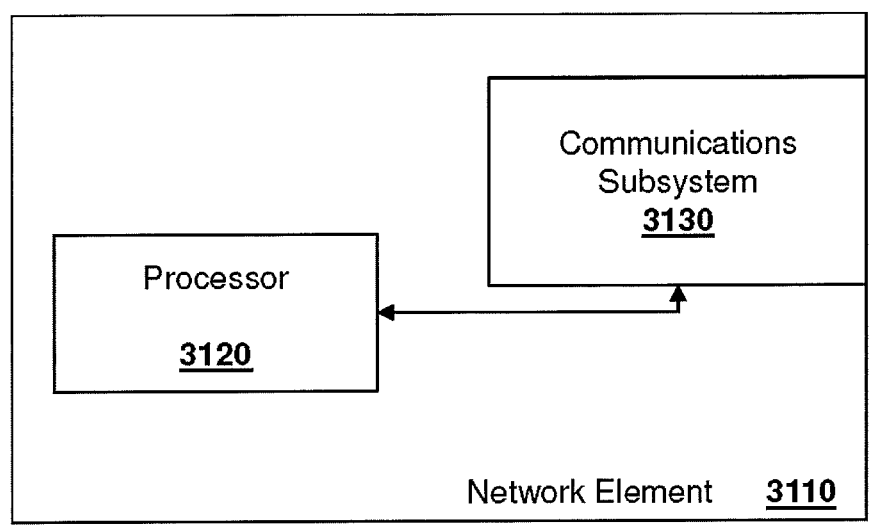
FIG. 20 is a simplified block diagram of an exemplary network element according to one embodiment.

The above may be implemented by a network element. A simplified network element is shown with regard to FIG. 20. In FIG. 20, network element 3110 includes a processor 3120 and a communications subsystem 3130, where the processor 3120 and communications subsystem 3130 cooperate to perform the methods described above.

Figure 21:
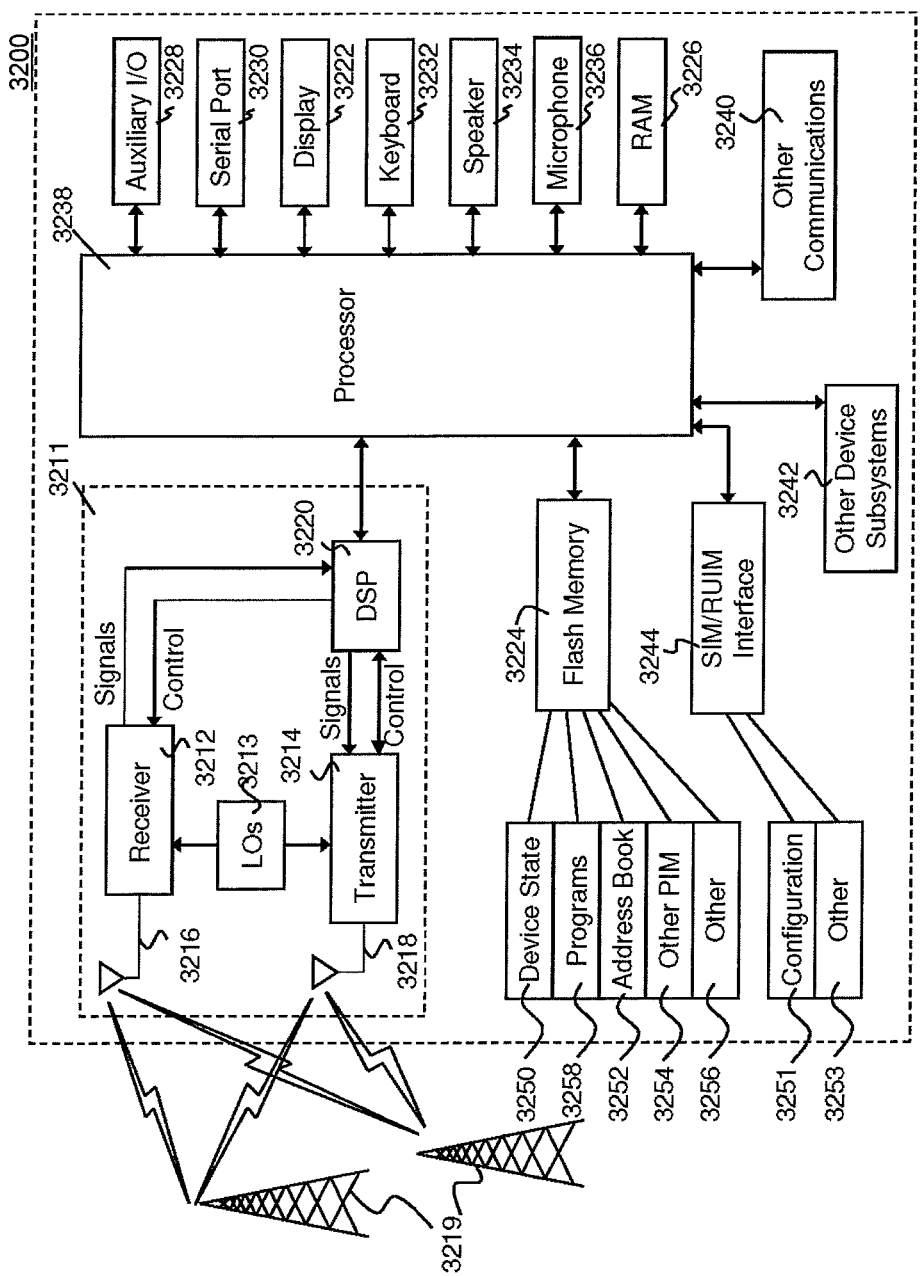
FIG. 21 is a block diagram with an example user equipment capable of being used with the systems and methods in the embodiments described herein.

Further, the above may be implemented by a UE. An example of a UE is described below with regard to FIG. 21. UE 3200 may comprise a two-way wireless communication device having voice and data communication capabilities. In some embodiments, voice communication capabilities are optional. The UE 3200 generally has the capability to communicate with other computer systems on the Internet. Depending on the exact functionality provided, the UE 3200 may be referred to as a data messaging device, a two-way pager, a wireless e-mail device, a cellular telephone with data messaging capabilities, a wireless Internet appliance, a wireless device, a smart phone, a mobile device, or a data communication device, as examples.

Where the UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. The particular design of the communication subsystem 3211 may be dependent upon the communication network in which the UE 3200 is intended to operate.

Network access requirements may also vary depending upon the type of network 3219. In some networks, network access is associated with a subscriber or user of the UE 3200. The UE 3200 may require a removable user identity module (RUIM) or a subscriber identity module (SIM) card in order to operate on a network. The SIM/RUIM interface 3244 is typically similar to a card slot into which a SIM/RUIM card may be inserted. The SIM/RUIM card may have memory and may hold many key configurations 3251 and other information 3253, such as identification and subscriber-related information.

When required network registration or activation procedures have been completed, the UE 3200 may send and receive communication signals over the network 3219. As illustrated, the network 3219 may consist of multiple base stations communicating with the UE 3200.

Signals received by antenna 3216 through communication network 3219 are input to receiver 3212, which may perform such common receiver functions as signal amplification, frequency down conversion, filtering, channel selection, and the like. Analog to digital (A/D) conversion of a received signal allows more complex communication functions, such as demodulation and decoding to be performed in the DSP 3220. In a similar manner, signals to be transmitted are processed, including modulation and encoding for example, by DSP 3220 and are input to transmitter 3214 for digital to analog (D/A) conversion, frequency up conversion, filtering, amplification, and transmission over the communication network 3219 via antenna 3218. DSP 3220 not only processes communication signals but also provides for receiver and transmitter control. For example, the gains applied to communication signals in receiver 3212 and transmitter 3214 may be adaptively controlled through automatic gain control algorithms implemented in DSP 3220.

The UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem, and any other device subsystems generally designated as 3242. Serial port 3230 may include a USB port or other port currently known or developed in the future.

Some of the illustrated subsystems perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions, such as a calculator or task list.

Operating system software used by the processor 3238 may be stored in a persistent store such as flash memory 3224, which may instead be a read-only memory (ROM) or similar storage element (not shown). The operating system, specific device applications, or parts thereof, may be temporarily loaded into a volatile memory such as RAM 3226. Received communication signals may also be stored in RAM 3226.

As shown, flash memory 3224 may be segregated into different areas for both computer programs 3258 and program data storage 3250, 3252, 3254 and 3256. These different storage types indicate that each program may allocate a portion of flash memory 3224 for their own data storage requirements. Processor 3238, in addition to its operating system functions, may enable execution of software applications on the UE 3200. A predetermined set of applications that control basic operations, including at least data and voice communication applications for example, may typically be installed on the UE 3200 during manufacturing. Other applications may be installed subsequently or dynamically.

Applications and software may be stored on any computer-readable storage medium. The computer-readable storage medium may be tangible or in a transitory/non-transitory medium such as optical (e.g., CD, DVD, etc.), magnetic (e.g., tape), or other memory currently known or developed in the future.

One software application may be a personal information manager (PIM) application having the ability to organize and manage data items relating to the user of the UE 3200 such as, but not limited to, e-mail, calendar events, voice mails, appointments, and task items. One or more memory stores may be available on the UE 3200 to facilitate storage of PIM data items. Such a PIM application may have the ability to send and receive data items via the wireless network 3219. Further applications may also be loaded onto the UE 3200 through the network 3219, an auxiliary I/O subsystem 3228, serial port 3230, short-range communications subsystem 3240, or any other suitable subsystem 3242, and installed by a user in the RAM 3226 or a non-volatile store (not shown) for execution by the processor 3238. Such flexibility in application installation may increase the functionality of the UE 3200 and may provide enhanced on-device functions, communication-related functions, or both. For example, secure communication applications may enable electronic commerce functions and other such financial transactions to be performed using the UE 3200.

In a data communication mode, a received signal such as a text message or web page download may be processed by the communication subsystem 3211 and input to the processor 3238, which may further process the received signal for output to the display 3222, or alternatively to an auxiliary I/O device 3228.

A user of the UE 3200 may also compose data items, such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of the UE 3200 is similar, except that received signals may typically be output to a speaker 3234 and signals for transmission may be generated by a microphone 3236. Alternative voice or audio I/O subsystems, such as a voice message recording subsystem, may also be implemented on the UE 3200. Although voice or audio signal output may be accomplished primarily through the speaker 3234, display 3222 may also be used to provide an indication of the identity of a calling party, the duration of a voice call, or other voice call-related information, for example.

Serial port 3230 may be implemented in a personal digital assistant (PDA)-type device for which synchronization with a user's desktop computer (not shown) may be desirable, but such a port is an optional device component. Such a port 3230 may enable a user to set preferences through an external device or software application and may extend the capabilities of the UE 3200 by providing for information or software downloads to the UE 3200 other than through a wireless communication network. The alternate download path may, for example, be used to load an encryption key onto the UE 3200 through a direct and thus reliable and trusted connection to thereby enable secure device communication. Serial port 3230 may further be used to connect the device to a computer to act as a modem.

Other communications subsystems 3240, such as a short-range communications subsystem, are further optional components which may provide for communication between the UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi, WiMAX, near field communication (NFC), and/or radio frequency identification (RFID). The other communications element 3240 may also be used to communicate with auxiliary devices such as tablet displays, keyboards or projectors.

Figure 22:
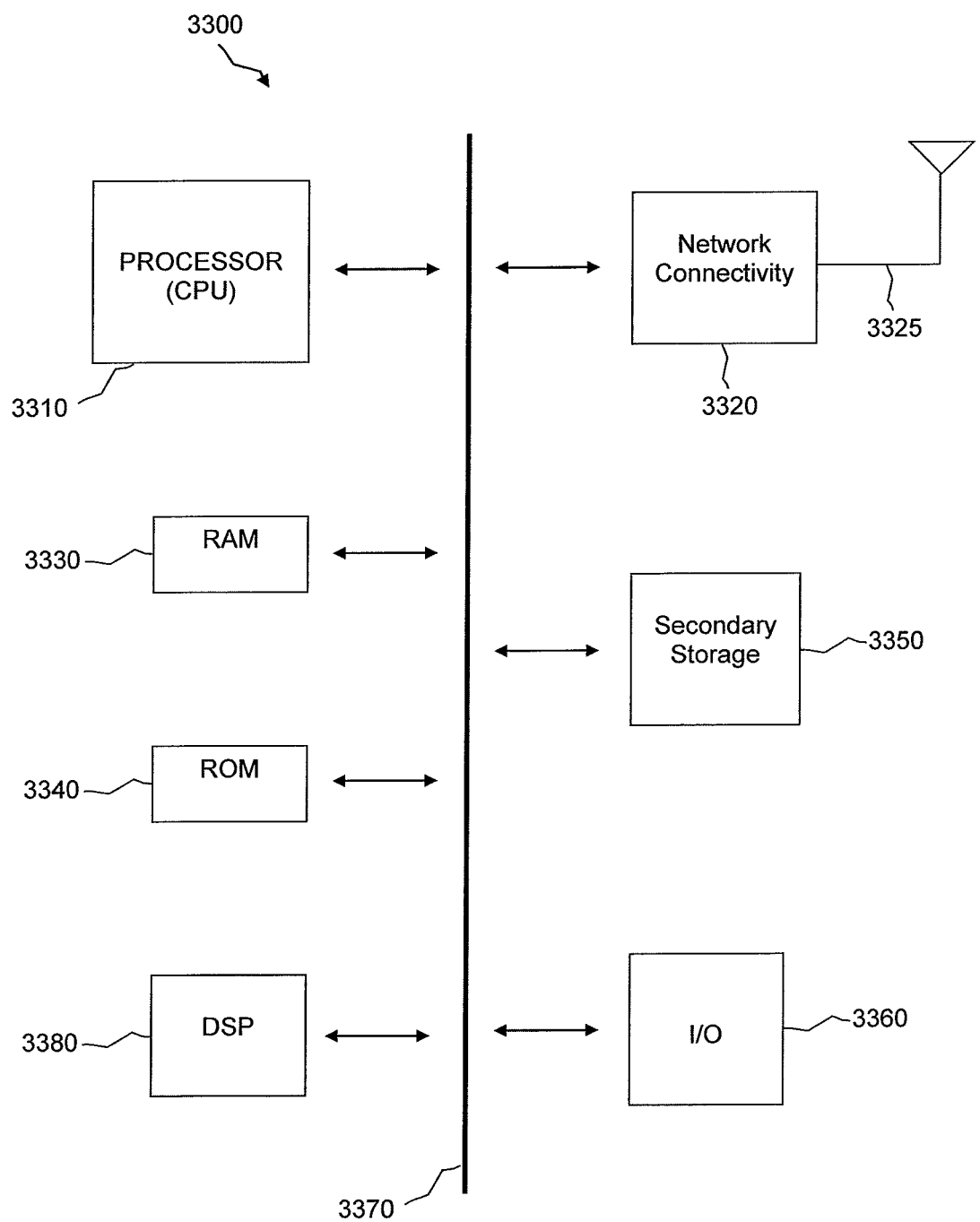
FIG. 22 illustrates a processor and related components suitable for implementing the several embodiments of the present disclosure.

The UE and other components described above might include a processing component that is capable of executing instructions related to the actions described above. FIG. 22 illustrates an example of a system 3300 that includes a processing component 3310 suitable for implementing one or more embodiments disclosed herein. In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

In an embodiment, a method is provided for communication in a wireless telecommunication system. The method comprises adaptively designating, by a network element following a frame-based communication protocol, for use as a secondary component carrier in a carrier aggregation scheme, at least a portion of radio resources on an unlicensed band.

In another embodiment, a network element following a frame-based communication protocol is provided. The network element comprises a processor configured such that the network element adaptively designates, for use as a secondary component carrier in a carrier aggregation scheme, at least a portion of radio resources on an unlicensed band.

In another embodiment, a UE is provided. The UE comprises a processor configured such that the UE receives at least a portion of radio resources on an unlicensed band, the at least a portion of radio resources on the unlicensed band having been adaptively designated by a network element following a frame-based communication protocol for use as a secondary component carrier in a carrier aggregation scheme.

In another embodiment, a method is provided for communication in a wireless telecommunication system. The method comprises adaptively using, by a network element following a frame-based communication protocol, at least a portion of radio resources not being used by another network element following a contention-based communication protocol.

In another embodiment, a method is provided for communication in a wireless telecommunication system. The method comprises adaptively using, by a network element following a 3GPP LTE protocol, at least a portion of bandwidth that is not being used by a network element following a WiFi protocol based on an IEEE 802.11 standard, wherein the portion of radio resources is on an unlicensed band that is used as a secondary component carrier in a carrier aggregation scheme.

The following are incorporated herein by reference for all purposes: 3GPP TS 36.211, 3GPP TS 25.105 and 3GPP TR 36.808.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method performed by a first network element of a wireless telecommunication system, the method comprising:
   determining, by the first network element, an order for a plurality of component carriers (CC) corresponding to wireless channels according to a rank;
   selecting, by the first network element, one of the plurality of CCs having a highest rank according to the rank for the plurality of CCs;
   sending, by the first network element to a second network element, data describing the selected one of the plurality of CCs having the highest rank;
   receiving, by the first network element from the second network element, a confirmation indicating that traffic from a first CC is permitted to be offloaded onto the selected one of the plurality of CCs having the highest rank; and
   enabling, by the first network element, traffic from the first CC to be offloaded onto the selected one of the plurality of CCs having the highest rank in response to receiving the confirmation from the second network element.

2. The method of claim 1, further comprising:
   sending, by the first network element to the second network element, data describing a second CC of the plurality of CCs having a next highest rank according to the rank for the plurality of CCs, wherein the second CC is different from the first CC and the selected one of the plurality of CCs;
   receiving, by the first network element from the second network element, a negative confirmation indicating that traffic from the first CC is not permitted to be offloaded onto the second CC of the plurality of CCs; and
   selecting, by the first network element, another CC of the plurality of CCs having a next highest rank according to the rank for the plurality of CCs in response to receiving the negative confirmation from the second network element, wherein the other CC of the plurality of CCs is different from the first CC, the second CC, and the selected one of the plurality of CCs.

3. The method of claim 1, wherein the plurality of CCs are ordered according to the rank based on measurement feedback received from one or more User Equipment (UE), wherein the measurement feedback comprises at least one of Wi-Fi beacon transmission parameters, path loss, traffic load of a Wi-Fi system, or a maximum access control (MAC) payload size set by a Wi-Fi access point (AP).

4. The method of claim 1, wherein the second network element is at least one of a self-organizing network entity or a network server.

5. The method of claim 1, wherein the second network element is a home Evolved Universal Terrestrial Radio Access Network (E-UTRAN) node B (eNB) (HeNB) gateway.

6. The method of claim 1, wherein the one of the plurality of CCs having the highest rank corresponds to a CC in an unlicensed band.

7. A first network element, comprising:
   at least one memory device; and
   a processor configured to execute instructions stored on the at least one memory device such that when executed, cause the first network element to:
      determine an order for a plurality of component carriers (CC) corresponding to wireless channels according to a rank;
      select one of the plurality of CCs having a highest rank according to the rank for the plurality of CCs;
      transmit data describing the selected one of the plurality of CCs having the highest rank to a second network element;
      receive, from the second network element, a confirmation indicating that traffic from a first CC is permitted to be offloaded onto the selected one of the plurality of CCs having the highest rank; and
      enable traffic from the first CC to be offloaded onto the selected one of the plurality of CCs having the highest rank in response to receiving the confirmation from the second network element.

8. The first network element of claim 7, wherein the processor is further configured to execute the instructions stored on the at least one memory device such that when executed, cause the first network element to:
   send, to the second network element, data describing a second CC of the plurality of CCs having a next highest rank according to the rank for the plurality of CCs, wherein the second CC is different from the first CC and the selected one of the plurality of CCs;
receive, from the second network element, a negative confirmation indicating that traffic from the first CC is not permitted to be offloaded onto the second CC of the plurality of CCs; and
select another CC of the plurality of CCs having a next highest rank according to the rank for the plurality of CCs in response to receiving the negative confirmation from the second network element, wherein the other CC of the plurality of CCs is different from the first CC, the second CC, and the selected one of the plurality of CCs.

9. The first network element of claim 7, wherein the plurality of CCs are ordered according to the rank based on measurement feedback received from one or more User Equipment (UE), wherein the measurement feedback comprises at least one of Wi-Fi beacon transmission parameters, path loss, traffic load of a Wi-Fi system, or a maximum access control (MAC) payload size set by a Wi-Fi access point (AP).

10. The first network element of claim 7, wherein the second network element is at least one of a self-organizing network entity or a network server.

11. The first network element of claim 7, wherein the second network element is a home Evolved Universal Terrestrial Radio Access Network (E-UTRAN) node B (eNB) (HeNB) gateway.

12. The first network element of claim 7, wherein the one of the plurality of CCs having the highest rank corresponds to a CC in an unlicensed band.

13. A non-transitory computer medium storing instructions executable by a processor of a first network element such that when executed, cause the first network element to perform a method, the method comprising:
determining, by the first network element, an order for a plurality of component carriers (CC) corresponding to wireless channels according to a rank;
selecting, by the first network element, one of the plurality of CCs having a highest rank according to the rank for the plurality of CCs;
sending, by the first network element to a second network element, data describing the selected one of the plurality of CCs having the highest rank;
receiving, by the first network element from the second network element, the confirmation indicating that traffic from a first CC is permitted to be offloaded onto the selected one of the plurality of CCs having the highest rank; and
enabling, by the first network element, traffic from the first CC to be offloaded onto the selected one of the plurality of CCs having the highest rank in response to receiving the confirmation from the second network element.

14. The non-transitory computer medium of claim 13, wherein the method further comprises:
sending, by the first network element to the second network element, data describing a second CC of the plurality of CCs having a next highest rank according to the rank for the plurality of CCs, wherein the second CC is different from the first CC and the selected one of the plurality of CCs;
receiving, by the first network element from the second network element, a negative confirmation indicating that traffic from the first CC is not permitted to be offloaded onto the second CC of the plurality of CCs having the highest rank; and
selecting, by the first network element, another CC of the plurality of CCs having a next highest rank according to the rank for the plurality of CCs in response to receiving the negative confirmation from the second network element, wherein the other CC of the plurality of CCs is different from the first CC, the second CC, and the selected one of the plurality of CCs.

15. The non-transitory computer medium of claim 13, wherein the plurality of CCs are ordered according to the rank based on measurement feedback received from one or more User Equipment (UE), wherein the measurement feedback comprises at least one of Wi-Fi beacon transmission parameters, path loss, traffic load of a Wi-Fi system, or a maximum access control (MAC) payload size set by a Wi-Fi access point (AP).

16. The non-transitory computer medium of claim 13, wherein the second network element is at least one of a self-organizing network entity, a network server, or a home Evolved Universal Terrestrial Radio Access Network (E-UTRAN) node B (eNB) (HeNB) gateway.

17. The non-transitory computer medium of claim 13, wherein the one of the plurality of CCs having the highest rank corresponds to a CC in an unlicensed band.

* * * * *